(12) United States Patent
Hall

(10) Patent No.: US 12,296,508 B2
(45) Date of Patent: May 13, 2025

(54) COUNTERTOP

(71) Applicant: American Woodmark Management Company, Anaheim, CA (US)

(72) Inventor: Randall B. Hall, La Habra Heights, CA (US)

(73) Assignee: American Woodmark Management Company, Winchester, VA (US)

( * ) Notice: Subject to any disclaimer, the term of this patent is extended or adjusted under 35 U.S.C. 154(b) by 166 days.

(21) Appl. No.: 17/937,552

(22) Filed: Oct. 3, 2022

(65) Prior Publication Data

US 2023/0099929 A1    Mar. 30, 2023

Related U.S. Application Data

(63) Continuation of application No. 17/301,934, filed on Apr. 19, 2021, now Pat. No. 11,478,957, which is a
(Continued)

(51) Int. Cl.
    *B29C 33/50*     (2006.01)
    *B29C 33/30*     (2006.01)
    (Continued)

(52) U.S. Cl.
CPC ............ *B29C 33/50* (2013.01); *B29C 33/306* (2013.01); *B29C 33/405* (2013.01); *B29C 33/44* (2013.01); *B29C 37/0025* (2013.01); *B29C 70/44* (2013.01); *B29C 37/0032* (2013.01); *B29C 2037/0035* (2013.01); *B29C 39/36* (2013.01); *B29C 45/1679* (2013.01); *B29K 2103/04* (2013.01); *B29K 2995/0021* (2013.01); *B29L 2031/441* (2013.01); *B29L 2031/7698* (2013.01); *E03C 1/18* (2013.01)

(58) Field of Classification Search
CPC ..... B29C 33/50; B29C 33/306; B29C 33/405; B29C 33/44; B29C 37/0025; B29C 37/0032; B29C 70/44; B29C 45/1679; E03C 1/18
USPC .............................................. 4/631–637, 650
See application file for complete search history.

(56) References Cited

U.S. PATENT DOCUMENTS 847,018 A     3/1907   Maddock
2,083,484 A     6/1937   Zampol
(Continued)

FOREIGN PATENT DOCUMENTS

| DE | 845261 | 7/1952 |
|----|--------|--------|
| EP | 1114715 | 7/2001 |
| JP | 59196219 | 11/1984 |

*Primary Examiner* — Tuan N Nguyen
(74) *Attorney, Agent, or Firm* — Knobbe, Martens, Olson & Bear, LLP

(57) ABSTRACT

The improved mold assembly for cultured marble molding is provided. The mold assembly can comprise a male mold portion and a female mold portion. The assembly can further comprise a molding tool. The molding tool can have a side wall having an upper curved s and a lower curved portion. The molding tool can be constructed from a flexible and/or soft material. The lower curved portion of the molding tool can be coated with a gel coat having a first color. The molding tool can facilitate molding of a countertop having a recessed bowl portion having a color different from a counter portion of the countertop.

14 Claims, 21 Drawing Sheets

Related U.S. Application Data continuation of application No. 16/179,570, filed on Nov. 2, 2018, now Pat. No. 11,007,680, which is a continuation of application No. 15/177,177, filed on Jun. 8, 2016, now Pat. No. 10,145,093.

(60) Provisional application No. 62/173,162, filed on Jun. 9, 2015.

(51) Int. Cl.
  *B29C 33/40* (2006.01)
  *B29C 33/44* (2006.01)
  *B29C 37/00* (2006.01)
  *B29C 45/16* (2006.01)
  *B29C 70/44* (2006.01)
  *E03C 1/18* (2006.01)
  B29C 39/36 (2006.01)
  B29K 103/04 (2006.01)
  B29L 31/00 (2006.01)
  B29L 31/44 (2006.01)

(56) References Cited

U.S. PATENT DOCUMENTS

| | | |
|---|---|---|
| 2,127,559 A | 8/1938 | Graf |
| 2,798,373 A | 7/1957 | Harza |
| 3,353,220 A | 11/1967 | Raymond |
| 3,433,860 A | 3/1969 | Ruggles et al. |
| 3,594,877 A | 7/1971 | Suda et al. |
| 3,673,617 A | 7/1972 | Schulz, Jr. |
| 3,776,683 A | 12/1973 | Putzer et al. |
| 3,813,076 A | 5/1974 | Draughon et al. |
| 3,937,438 A | 2/1976 | Fox et al. |
| 3,998,422 A | 12/1976 | Putzer |
| 4,055,620 A | 10/1977 | Conrad |
| 4,133,626 A | 1/1979 | Schubart |
| 4,209,862 A | 7/1980 | Cortes-Garza |
| 4,235,948 A | 11/1980 | Holmes |
| 4,289,717 A | 9/1981 | Bortz |
| 4,315,037 A | 2/1982 | Kelly |
| 4,328,179 A | 5/1982 | Garasi et al. |
| 4,807,844 A | 2/1989 | Tu |
| 4,894,272 A | 1/1990 | Aisley |
| 5,087,193 A | 2/1992 | Herbert, Jr. |
| 5,129,804 A | 7/1992 | Perantoni et al. |
| 5,134,002 A | 7/1992 | Vallier |
| 5,275,547 A | 1/1994 | Brown |
| 5,683,638 A | 11/1997 | Crigler et al. |
| 5,868,957 A | 2/1999 | Bordener |
| 5,885,503 A | 3/1999 | Bordener |
| 5,948,333 A | 9/1999 | Blackmon |
| 6,000,673 A | 12/1999 | Bordener |
| 6,030,560 A | 2/2000 | Bortz, Jr. |
| 6,083,339 A | 7/2000 | Peters et al. |
| 6,799,336 B2 | 10/2004 | Freeman |
| 9,878,469 B2 | 1/2018 | Le Duff et al. |
| 10,145,093 B2 | 12/2018 | Hall |
| 10,730,205 B2 | 8/2020 | Le Duff et al. |
| 11,007,680 B2 | 5/2021 | Hall |
| 11,345,063 B2 | 5/2022 | Le Duff et al. |
| 11,478,957 B2 | 10/2022 | Hall |
| 2004/0046280 A1 | 3/2004 | Harrington |
| 2004/0089965 A1 | 5/2004 | Malfliet et al. |
| 2004/0121161 A1 | 6/2004 | Shugert et al. |
| 2004/0222550 A1 | 11/2004 | Baldoni |
| 2006/0019046 A1 | 1/2006 | Deane |
| 2006/0275526 A1 | 12/2006 | Benkovszki et al. |
| 2007/0063378 A1 | 3/2007 | O'Donoghue |
| 2008/0276366 A1 | 11/2008 | Bitowft |
| 2010/0075083 A1 | 3/2010 | Harbaugh |
| 2010/0123270 A1 | 5/2010 | Owens et al. |
| 2010/0132109 A1 | 6/2010 | Kim et al. |
| 2012/0073042 A1 | 3/2012 | Galinier |
| 2013/0309511 A1 | 11/2013 | Le Duff |
| 2014/0259362 A1 | 9/2014 | Zimbric |
| 2015/0021458 A1 | 1/2015 | Zorovich et al. |
| 2022/0396010 A1 | 12/2022 | Le Duff et al. |
| 2024/0068215 A1* | 2/2024 | Yin .................. E03C 1/18 |

* cited by examiner

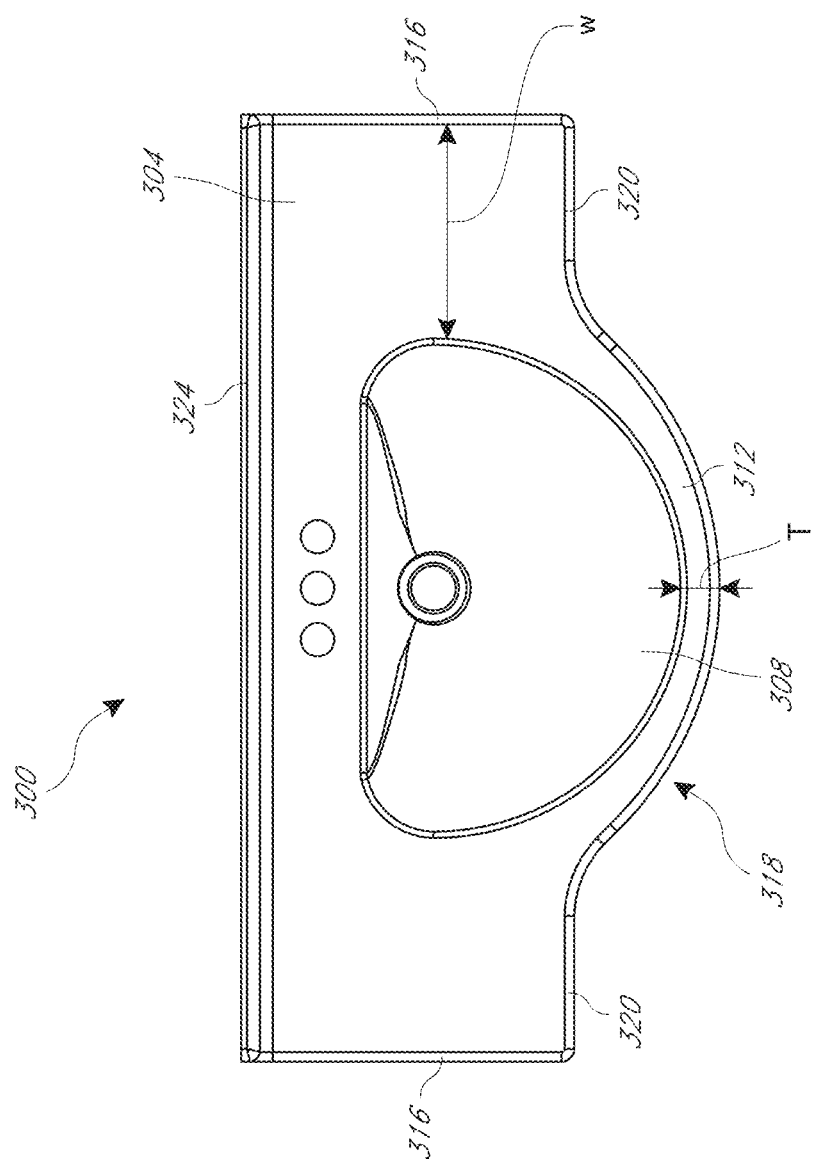

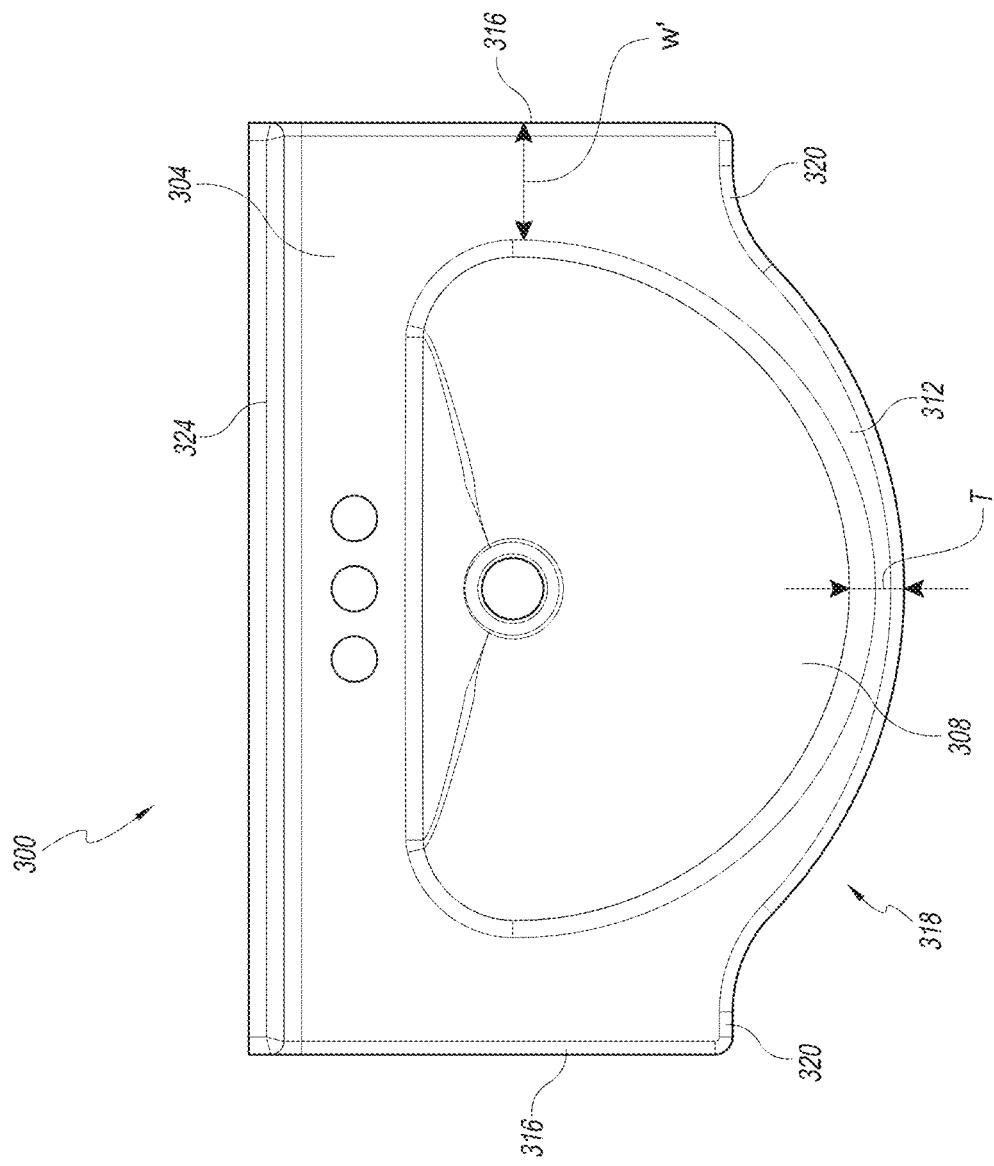

COUNTERTOP

CROSS-REFERENCE TO RELATED APPLICATIONS

This application is a continuation of U.S. patent application Ser. No. 17/301,934, filed Apr. 19, 2021, which is a continuation of U.S. patent application Ser. No. 16/179,570, filed Nov. 2, 2018, which is a continuation of U.S. patent application Ser. No. 15/177,177, filed Jun. 8, 2016, which claims benefit under 35 U.S.C. § 119(e) to U.S. Provisional Patent Application No. 62/173,162, filed Jun. 9, 2015, which is incorporated in its entirety by reference herein.

BACKGROUND

Technical Field

This application relates to improved molding tools for molding countertops and other structures.

Description of the Related Art

Countertops (e.g., cultured marble countertops) have traditionally been produced in fiber glass reinforced plastic (FRP) molds. For example, two or more mold plates may be mated together in a mating direction to form an internal mold space. Traditionally, FRP molds utilized a positive draft (e.g., a mold in which every molding surface of every mold component is visible when viewed parallel to the mating direction). In many cases, traditional FRP molds are incapable of utilizing negative drafts (e.g., mold drafts wherein some molding surfaces are hidden from view when viewed along the mating direction).

SUMMARY

In some applications, it is desirable to produce a sink and countertop combination wherein the sink appears to be a recessed sink. For example, the countertop can overhang the sink such that a perimeter of the overhang is smaller than a perimeter of the top of the sink bowl portion. The sink bowl may have a different texture and/or color from the countertop portion. Such color/texture differentiation may provide the appearance of two separate structural components. Preferably, the bowl portion and countertop portion are formed as a unitary and/or continuous part. In some cases, use of a flexible mold insert can facilitate molding of a unitary countertop-bowl combination having an overhang portion.

According to some variants, a mold assembly for cultured marble molding includes a mold frame assembly. The mold frame assembly can have a male mold portion and a female mold portion configured to removably mate with the male mold portion. The mold frame can define a mold interior when the male mold portion is mated with the female mold portion. The mold assembly can include a flexible insert configured to fit within the mold interior. The flexible insert can have a bowl portion having a product surface and mold engaging surface configured to releasably mate with a bowl protrusion on the male mold portion. In some embodiments, the mold frame assembly and the flexible insert define a product mold volume when the male mold portion is mated with the female mold portion and the bowl portion is mated with the bowl protrusion, the product mold volume defining a product bowl space at least partially defined by the bowl portion.

In some configurations, the product surface of the flexible insert is convex and the mold engaging surface of the flexible insert is concave.

In some configurations, the product surface of the flexible insert is coated with a gel coat.

In some configurations, the male mold portion comprises a plurality of separable male mold sections.

In some configurations, the female mold portion comprises a plurality of separable female mold sections.

In some configurations, the flexible insert is constructed from a resilient material.

In some configurations, the flexible insert includes at least one protrusion extending from the mold engaging surface. In some cases, the male mold portion includes at least one recess configured to releasably mate with the at least one protrusion of the flexible insert.

In some configurations, the product mold volume defines a product counter portion, the product counter portion extending outward from the product bowl space and having a planar or generally planar shape.

In some configurations, the product surface of the flexible insert is coated with a first gel coat. In some configurations, portions of the male mold portion and of the female mold portion which define the product countertop portion of the product mold volume are coated with a second gel coat. In some configurations, the second gel coat has a color and/or texture different from a color and/or texture of the first gel coat.

In some configurations, the product surface of the flexible insert is coated with a first gel coat. In some configurations, no portion of the male and female mold portions are coated with a gel coat.

In some configurations, the product surface of the flexible insert is coated with a first gel coat and with a second gel coat.

In some configurations, the flexible insert includes at least one recess in the mold engaging surface. In some configurations, the male mold portion includes at least one protrusion configured to releasably mate with the at least one recess of the flexible insert.

According to some variants, a method of molding a countertop with an integral bowl includes providing a male mold portion. The method can include providing a flexible insert having a mold surface and a product surface. In some embodiments, the method includes applying a first gel coat having a first color to the product surface of the flexible insert. The method can include releasably mating the mold surface of the flexible insert to the male mold. In some embodiments, the method includes providing a female mold portion. The method can include releasably mating the female mold portion to the male mold portion such that the flexible insert is positioned between the female mold portion and the male mold portion, a space between the mated female mold portion and male mold portion defining a mold volume. In some embodiments, the mold volume has a countertop surface defined by the male mold portion and the female mold portion. The mold volume can have a bowl surface defined by the flexible insert. The method can include applying a second gel coat having a second color to the countertop surface of the mold volume. In some embodiments, the second color is different from the first color. The method can include backing the first and second gel coats with a composite matrix material into the mold volume. In some embodiments, the composite matrix material solidifies after a setting time to form a countertop integral with a recessed bowl. The method can include unmating the female mold portion from the male mold portion after the setting time has taken place. In some embodiments, the method includes removing the flexible insert from the countertop.

In some cases, the method includes removing the flexible insert from the male mold portion.

In some cases, the flexible insert is removed from the male mold portion after the flexible insert is removed from the countertop.

According to some variants, a mold assembly for cultured marble molding includes a male mold portion having a male mold projection. The mold assembly can include a female mold portion configured to releasably mate with the male mold portion. In some embodiments, the female mold portion and male mold portion form a mold interior volume when the female mold portion is mated with the male mold portion. The mold assembly can include a flexible insert configured to fit within the mold interior. In some embodiments, the flexible insert includes a bowl portion having a mold surface, a product surface, and an upper rim defined between the mold surface and the product surface. The flexible insert can include a drain protrusion extending from the product surface, the drain protrusion having a bottom end. In some embodiments, a product volume is defined within the mold interior volume. The product volume can include a countertop portion defined by surfaces of the male mold portion and surfaces of the female mold portion. The countertop portion can have a lower surface and a generally planar upper surface. In some embodiments, the product volume includes a sink bowl portion defined by the product surface of the flexible insert and by a surface of the female mold portion. In some embodiments, a height of the flexible insert as measured perpendicular to the upper surface of the countertop portion of the product volume between the bottom end of the drain protrusion and the upper rim of the bowl portion of the flexible insert is less than a height of the product volume as measured perpendicular to the upper surface of the countertop portion between the bottom end of the drain protrusion and the upper surface of the countertop portion.

In some configurations, the countertop portion of the product volume is partially defined by at least a portion of the upper rim of the bowl portion of the flexible insert.

In some configurations, an outer edge of the upper rim of the bowl portion of the flexible insert extends beyond an outer periphery of a portion of the male mold portion that contacts the upper rim of the bowl portion.

According to some variants, a method of molding a countertop with an integral bowl includes providing a male mold portion. The method can include providing a flexible insert having a mold surface and a product surface. In some embodiments, the method includes applying a first gel coat having a first color to the product surface of the flexible insert. The method can include releasably mating the mold surface of the flexible insert to the male mold. In some embodiments, the method includes providing a female mold portion. The method can include releasably mating the female mold portion to the male mold portion such that the flexible insert is positioned between the female mold portion and the male mold portion, a space between the mated female mold portion and male mold portion defining a mold volume. The mold volume can include a countertop surface defined by the male mold portion and the female mold portion. In some embodiments, the mold volume includes a bowl surface defined by the flexible insert. The method can include backing the first gel coat with a composite matrix material into the mold volume, wherein the composite matrix material solidifies after a setting time to form a countertop integral with a recessed bowl. In some embodiments, the method includes unmating the female mold portion from the male mold portion after the setting time has taken place. The method can include removing the flexible insert from the countertop.

According to some variants, a mold assembly for cultured marble molding can include a mold frame assembly. The mold frame assembly can have a male mold portion and a female mold portion configured to removably mate with the male mold portion, the mold frame defining a mold interior when the male mold portion is mated with the female mold portion. The mold assembly can include a flexible insert configured to fit within the mold interior. The flexible insert can have a product surface and mold engaging surface configured to releasably mate with the male mold portion. In some embodiments, the mold frame assembly and the flexible insert define a product mold volume when the male mold portion is mated with the female mold portion and the flexible insert is mated with the male mold portion, the product mold volume defining a product space at least partially defined by the product surface of the flexible insert.

According to some variants, a countertop includes a unitary sink and countertop structure. The unitary sink and countertop structure includes a countertop portion. In some embodiments, the unitary sink and countertop structure includes a bowl portion extending downward from the countertop portion. The bowl portion can have an open upper end having a bowl perimeter. In some embodiments, the unitary sink and countertop structure includes an overhang portion extending from the countertop portion over a portion of the bowl portion within the bowl perimeter.

In some configurations, the countertop includes a drain hole extending through a bottom portion of the bowl portion.

In some configurations, the overhang portion extends over the countertop portion by at least 3 mm.

In some configurations, the countertop is formed in a mold.

In some configurations, the bowl portion is a different color than the countertop portion.

In some configurations, the bowl portion is a different texture than the countertop portion.

In some configurations, a backing material forming a body of the countertop portion and a body of the bowl portion comprise a continuous uniform material.

BRIEF DESCRIPTION OF THE DRAWINGS

These and other features and advantages of the present embodiments will become more apparent upon reading the following detailed description and with reference to the accompanying drawings of the embodiments, in which:

FIG. 3C is a top elevation view of the molded product of FIG. 2A.

FIG. 5 is a top elevation view of the molded product of FIG. 4.

DETAILED DESCRIPTION

An improved mold assembly is disclosed herein. The embodiments disclosed herein are described in the context of a mold assembly for use in modeling sinks and countertops because the embodiments disclosed herein have particular utility in this context. However, the embodiments and inventions herein can also be applied to molding other types of solid surface products, including but not limited to tabletops, cutting boards, floor tiles, sculptures or other products.

Figure 1:
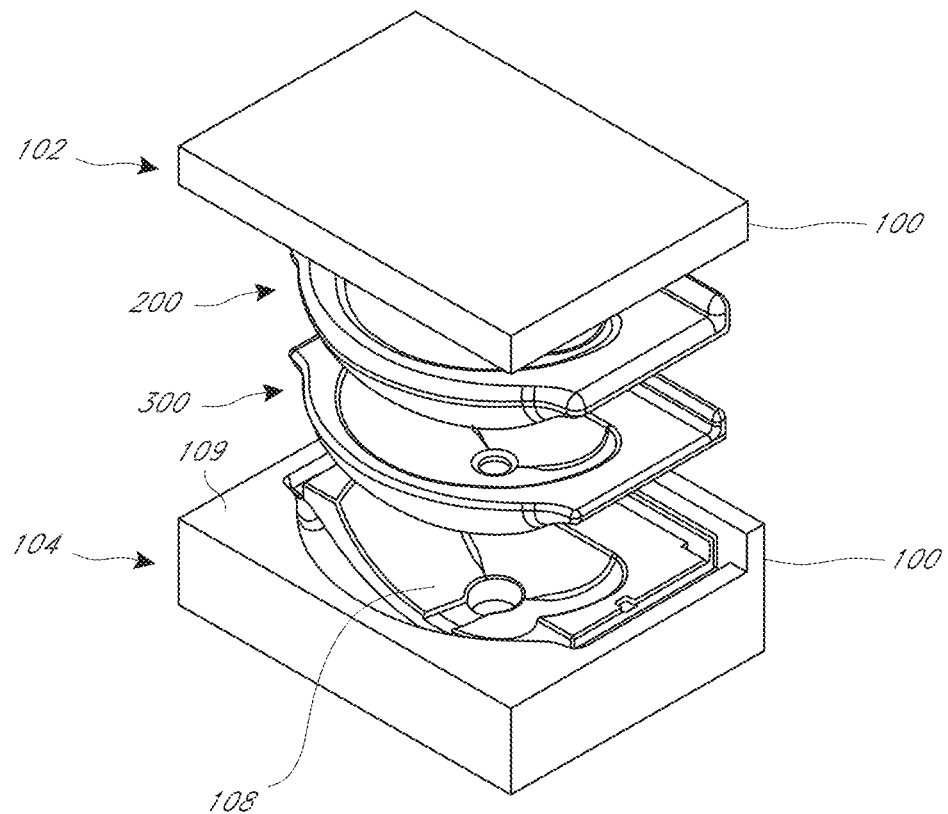
FIG. 1 is a perspective exploded view of an embodiment of a mold assembly.

A mold assembly 100 can include a male mold portion (e.g., male mold plate 102) and a female mold portion (e.g., female mold plate 104). The male mold plate 102 and female mold plate 104 can be configured to releasably mate with each other. The male mold plate 102 and female mold plate 104 can each form, separately or in combination, a mother tool. In some embodiments, more than two (e.g., 3, 4, 6, 10, 15, etc.) mold plates may be combined to form a mother tool. When mated, the mold plates 102, 104 may define a mold interior (e.g., the volume of space between the mold plates 102, 104 when the mold plates 102, 104 are mated). As illustrated in FIG. 1, the mold plates 102, 104 can mate along a mating plane (e.g., the plane defined by the top surface 109 of the female mold plate 104). In some embodiments, the mold plates 102, 104 are oriented as shown in FIG. 1 during the molding process (e.g., female mold plate 104 beneath male mold plate 102). In some embodiments, the female mold plate 104 is positioned above the male mold plate 102 during the molding process. In some cases, the mold plates 102, 104 are positioned beside each other or at some other relative orientation during the molding process.

Figure 1A:
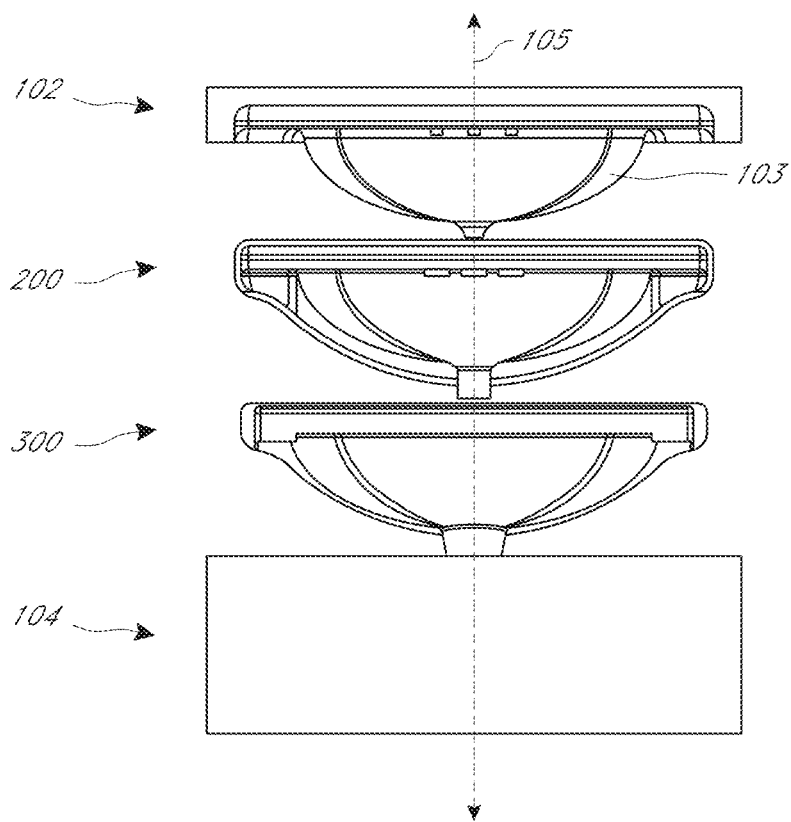
FIG. 1A is a rear exploded view of the mold assembly of FIG. 1.

The female mold plate 104 can include one or more cavities/recesses 108 for receiving a molding or soft tool (e.g., a flexible insert 200) and/or for defining a shape of a molded product 300. As illustrated in FIG. 1A, the male mold plate 102 can include one or more protrusions 103 for receipt by the flexible insert 200 and/or for defining a shape of the molded product 300.

Figure 2A:
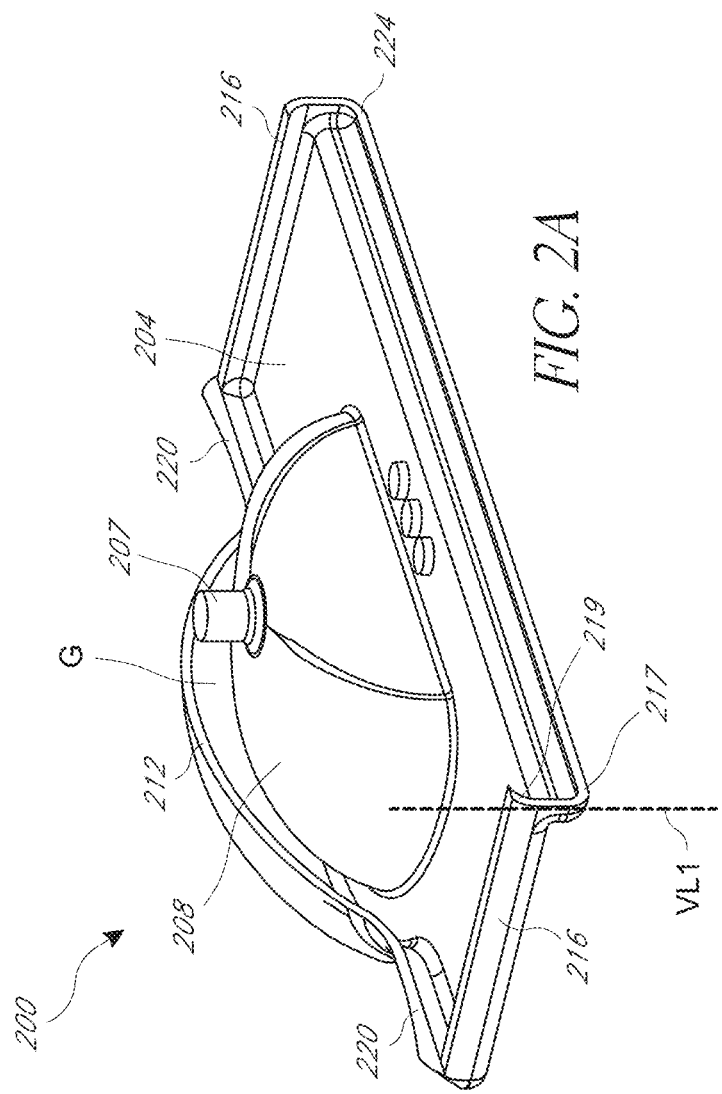
FIG. 2A is a bottom perspective view of an embodiment of a molding tool.
Figure 2B:
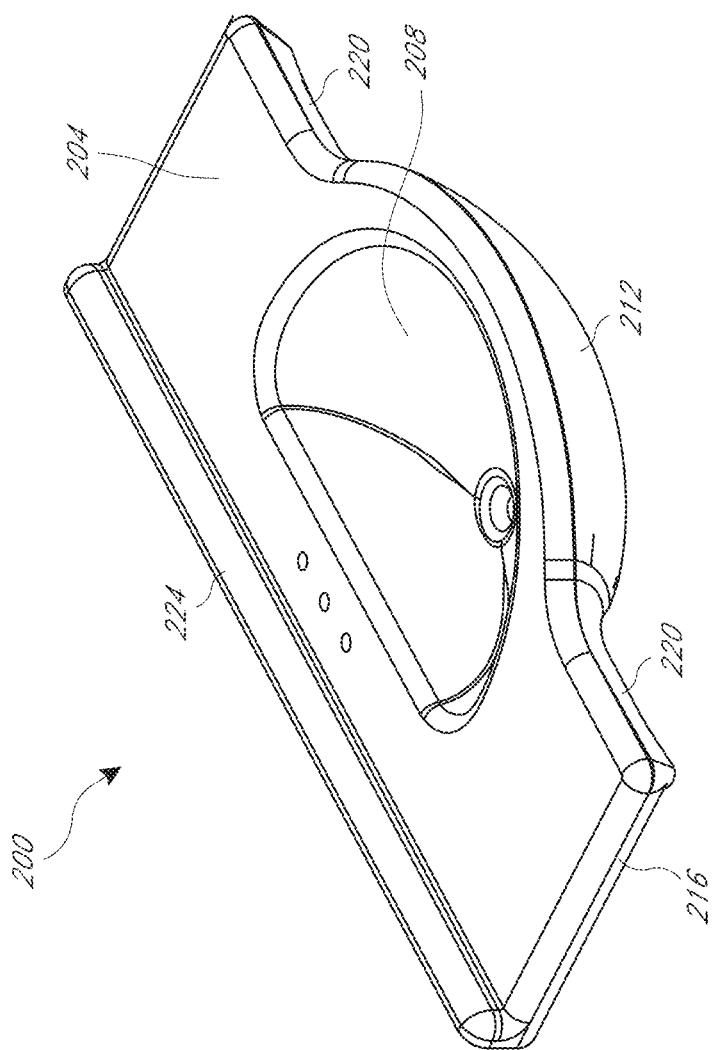
FIG. 2B is a top perspective view of the molding tool of FIG. 2A.
Figure 2C:
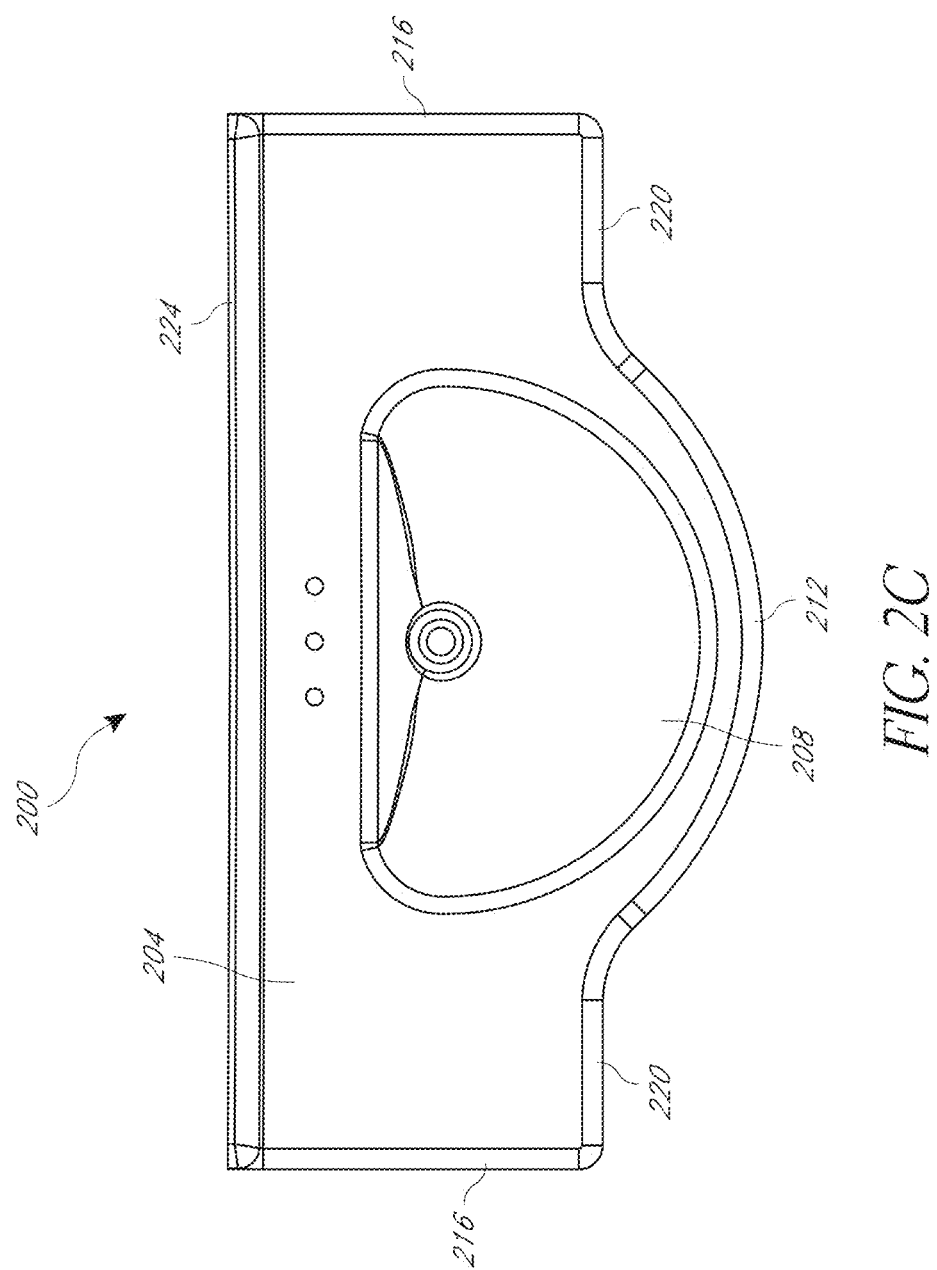
FIG. 2C is a top elevation view of the molding tool of FIG. 2A.
Figure 2D:
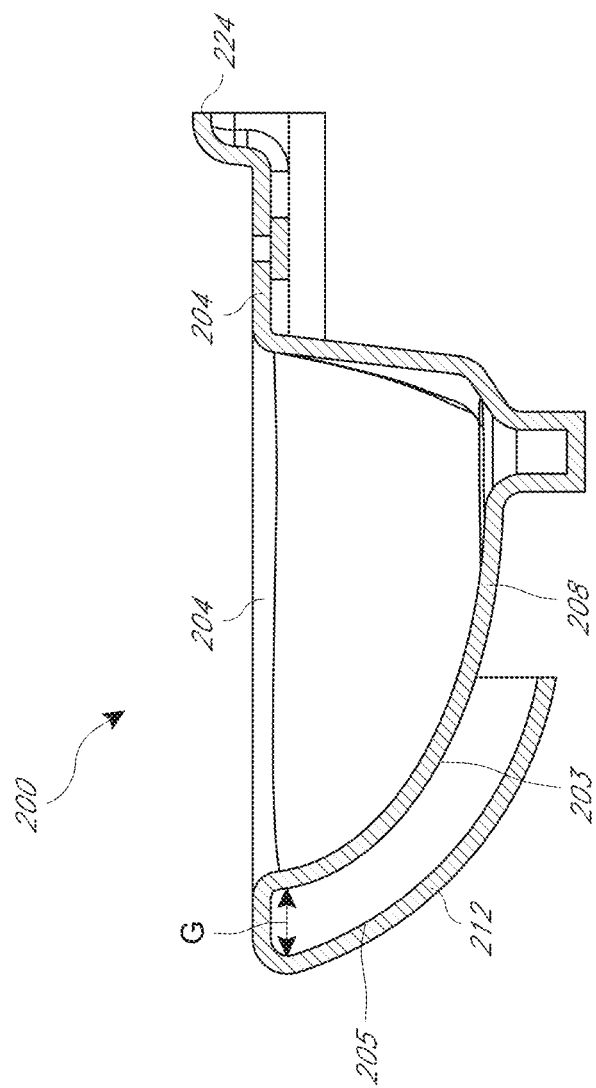
FIG. 2D is a side cross-section view of the molding tool of FIG. 2A.

As illustrated in FIG. 2A, the flexible insert 200 can include a main body portion 204. Portions of or the entire flexible insert 200 can be constructed from a soft and/or flexible material (e.g., rubber, polymers, latex, or other soft and/or flexible materials). The flexible insert 200 can include a bowl portion 208 projecting from the main body portion 204. Preferably, the bowl portion 208 and the main body portion 204 form a monolithic part. The bowl portion 208 can have a product surface (e.g., the convex surface of the bowl portion 208) and a mold engagement surface (e.g., the concave surface of the bowl portion 208). In some embodiments, the product surface of the bowl portion 208 comprises the first opposing surface 203 of the bowl portion 208 opposing a second opposing surface 205 of an apron 212, as illustrated in FIG. 2D and described below. The mold engagement surface can be configured to releasably mate with the male mold plate 200 (e.g., with one or more protrusions 103 on the male mold portion).

The main body portion 204 may have an outer perimeter from which sidewalls 216 and front walls 220 project. A portion of the outer perimeter of the main body portion 204 may include a back wall 224. The walls 216, 220 are preferably integral with the main body portion 204 to form a monolithic part. The front walls 220 and/or sidewalls 216 can include an upper curved portion 219 and a lower curved portion 217 (upper and lower corresponding to the orientation of the insert when the insert is positioned with the drain opening 207 facing upward, as in FIG. 2A). For example, the sidewalls 216 can include an upper curved portion 219 that curves inward (e.g., toward the body portion 204) from a vertical plane. The vertical plane can be plane tangential to a point on the outer perimeter of the main body portion 204. The vertical plane may be parallel to a vertical line VL1 (e.g., see FIG. 2A) and/or perpendicular to a plane on which the main body portion 204 lies. In some embodiments, the vertical plane is perpendicular to the mating plane of the male mold plate 102 and the female mold plate 104. In some embodiments, the vertical plane is parallel to a separation line 105 of the two mold portions (e.g., the direction in which one or both of the mold plates 102, 104 is moved to mate and unmate from the other mold plate 102, 104). The sidewalls 216 may include a lower curved portion 217 that curves inward (e.g., toward the body portion 204) from a vertical plane (e.g., the vertical plane as described above). In some embodiments, the back wall 224 lies at least partially on a vertical plane on a back side of the tool 200. The sidewalls 216 can be seamless (e.g., lacking in any seam produced by the interface of two or more components of the mold assembly 100—such as between the male mold plate 102 and the female mold plate 104) between the upper curved portions 219 and the lower curved portions 217. In some embodiments, the sidewalls 216 and/or front wall 220 have negative drafts. In some embodiments, the sidewalls 216 and/or the front wall 220 have structural detailing (e.g., protrusions, indentations, artistic patterns, ribs, etc.). The structural detailing of the sidewalls 216 and/or of the front wall 220 can be located on and/or between the upper curved portions 219 and the lower curved portions 217. The upper curved portion 219 and/or the lower curved portion 217 may have a radius of curvature of greater than or equal to ⅛ inches. In some embodiments the radius of curvature of the curved portions 217, 219 is greater than or equal to 0.25 inches. In some embodiments curved portion can define a radius. In some embodiments, the radius of curvature of the curved portions 217, 219 is greater than or equal to 1 inch. Many variations are possible, including, but not limited to, radii of curvature that vary along the lengths of the curved portions 217, 219. In some embodiments, the front walls 220 have upper and lower curved portions that are the same or similar in curvature and layout to the upper and lower curved portions 217, 219 of the sidewalls 216.

The flexible insert 200 can include an apron 212. The apron 212 can have a product surface (e.g., the concave surface of the apron 212) and a mold engaging surface (e.g., the convex surface of the apron 212). In some embodiments, the product surface of the apron 212 comprises the second opposing surface 205 of the apron 212 opposing the first opposing surface 203 of the bowl portion 208. Preferably, the apron 212 is integral with the main body portion 204 of the tool 200 (e.g., the apron 212, bowl portion 208, and main body portion 204 form a monolithic part). In some embodiments, the apron 212 connects to the main body portion 204 along a portion of the front wall 220. The product surface of the apron 212 can be spaced from the product surface of the bowl portion 208 by a gap G (e.g., see FIG. 2D). In some embodiments, the gap G is defined as the shortest distance between the spaced opposing surfaces 203, 205 (e.g., the spaced opposing product surfaces of the bowl portion 208 and the apron 212). In some embodiments, the gap G is greater than or equal to about 0.1 inches and/or less than or equal to about 12 inches. In some embodiments, the gap G is approximately ⅜ inches. In some embodiments, the gap G is approximately ½ inch, 1 inch, 2 inches, 3 inches, 4 inches, 5 inches, 6 inches, 7 inches, 8 inches, 9 inches, 10 inches, or any value therebetween. In some embodiments, the gap G is less than ¼ inches, less than ⅜ inches, less than ½ inches, less than ¾ inches, less than ⅞ inches, less than 1 inch, less than 2 inches, less than 3 inches, less than 4 inches, less than 5 inches, less than 6 inches, less than 7 inches, less than 8 inches, less than 9 inches or less than 10 inches. In some embodiments, the gap G is between ¼ inches and 8 inches, between ⅜ inches and 6 inches, or between 1 inch and 5 inches. Many variations are possible. The apron 212 can be configured to fit at least partially within an apron cavity of the female mold plate 104.

The space between the flexible insert 200 and the mold plates 102, 104 can define a product mold volume when the mold plates 102, 104 are mated together and the flexible insert 200 is mated with one or more of the mold plates 102, 104 within the mold interior. A gel coating may be applied (e.g., sprayed, painted) on the product surface of the bowl portion 208 and the apron 212. In some embodiments, the product surfaces of the bowl portion 208 and apron 212 may be sprayed and/or painted with a gel coating (e.g., a polyester gel coat) prior to and/or after mating the flexible insert with one of the mold plates 102, 104. For example, the apron 212 may be flexed away from the bowl portion 208 to permit access by the gel coat sprayer or other gel coat applied to the product surfaces of the bowl portion 208 and the apron 212. The flexible and/or soft material of the flexible insert 200 can be flexible enough to deflect to permit a sprayer (e.g., a gel coat sprayer as discussed below) to be positioned within 1 inch, within 2 inches, within three inches, within 4 inches, within 5 inches, or within 6 inches of the product surfaces of the bowl portion 208 and the apron 212. Some or all of the interior surfaces (e.g., the recesses of the female mold plate 104 and/or the protrusions of the male mold plate 102) may be sprayed with a gel coating prior to mating of the mold plates 102, 104. The gel coat may be sprayed on the interior surface of the mold plates 102, 104 and/or on the product surfaces of the bowl portion 208 and apron 212 in a precisely controlled layer (e.g., a substantially consistent thickness). The gel coat may be transparent, translucent, and/or opaque. In some embodiments, the gel coat has a color (e.g., white, black, gray, red, green, etc.). The gel coat may have multiple colors or textures. The product mold volume may include a product bowl portion at least partially defined by the distance (e.g., the gap G) between the apron 212 and the bowl portion 208 of the flexible insert 200.

Cultured marble, a composite matrix material, or some other solid surface material may be injected or poured into the product mold volume. For example, solid surface material may be poured through an opening in one of the male mold plate 102 and the female mold plate 104. In some cases, a composite matrix material is used to back the gel coat after the gel coat is applied to the interior surface of the mold plates 102, 104 and/or on the product surfaces of the bowl portion 208 and apron 212. For example, the composite matrix material can be poured into the product mold volume to cover the surfaces of the mold assembly 100 on which gel coat has been previously applied. In some embodiments, the solid surface material is poured through an opening at or near a sink drain portion of the female mold plate 104. The solid surface material may be left in the product mold volume until the solid surface material sets (e.g., solidifies and/or hardens). For example, the solid surface material may be left in the product mold volume until a composite set or thermoset process is completed. The use of a molding tool (e.g., the flexible insert 200) can allow for negative draft molding. In some embodiments, the flexible insert 200 is removed from the mold plates 102, 104 (e.g., the mother tool) when the setting process is complete. The flexible insert 200 may be removed from the solid surface material upon completion of the setting and/or molding process.

In some embodiments, setting of the solid surface material in the product mold volume results in the formation of a coated product (e.g., the countertop 300 of the FIGS. 1 and 3A-3D). The countertop 300 may comprise solidified solid surface material with a gel coat finish. As illustrated in FIGS. 3A-3D, the countertop 300 can include a counter portion 304. The counter portion 304 may have an outer periphery defined by side ends 316, a front end 318, and a back end 324. The countertop 300 may include a sink portion 308. The sink portion 308 and countertop 300 may form a monolithic part. The sink portion 308 can have an outer rim 312. The outer rim 312 may be seamless. The sink portion 308 may be at least partially formed within the product bowl portion of the product mold volume. The sink portion 308 can be integral with the counter portion 304. The sink portion 308 may be seamless. In some embodiments, the front end 318 of the counter portion 304 includes two outer front portions 320 and the outer rim 312.

The side ends 316 and/or front end 318 of the counter portion 304 may be seamless. In some embodiments, the front end 318 and/or side ends 316 can include an upper curved portion 319 and a lower curved portion 317. For example, side ends 316 can include an upper curved portion 319 that curves inward (e.g., toward the counter portion 304) from a vertical plane. In some embodiments, as illustrated in FIG. 4A, the side ends 316 include an upper curved portion or a lower curved portion, but not both. The vertical plane can be plane tangential to a point on the outer perimeter of the counter portion 304. The vertical plane may be parallel to a vertical line VL2 (e.g., see FIG. 3B) and perpendicular to a plane on which the counter portion 304 lies. In some embodiments, the vertical plane is perpendicular to the mating plane of the male mold plate 102 and the female mold plate 104. The side ends 316 may include a lower curved portion 317 that curves inward (e.g., toward the counter portion 304) from a vertical plane as described above. For example, the vertical plane can be parallel to the separation line 105 described above. In some embodiments, the back end 324 lies at least partially on a vertical plane on a back side of the countertop 300. The side ends 316 can be seamless. The upper curved portion 319 and/or the lower curved portion 317 of the side ends 316 and/or front end 318 may have a radius of curvature to match the radii of curvature of the upper and lower curved portions 219, 217 of the flexible insert 200.

Figure 3A:
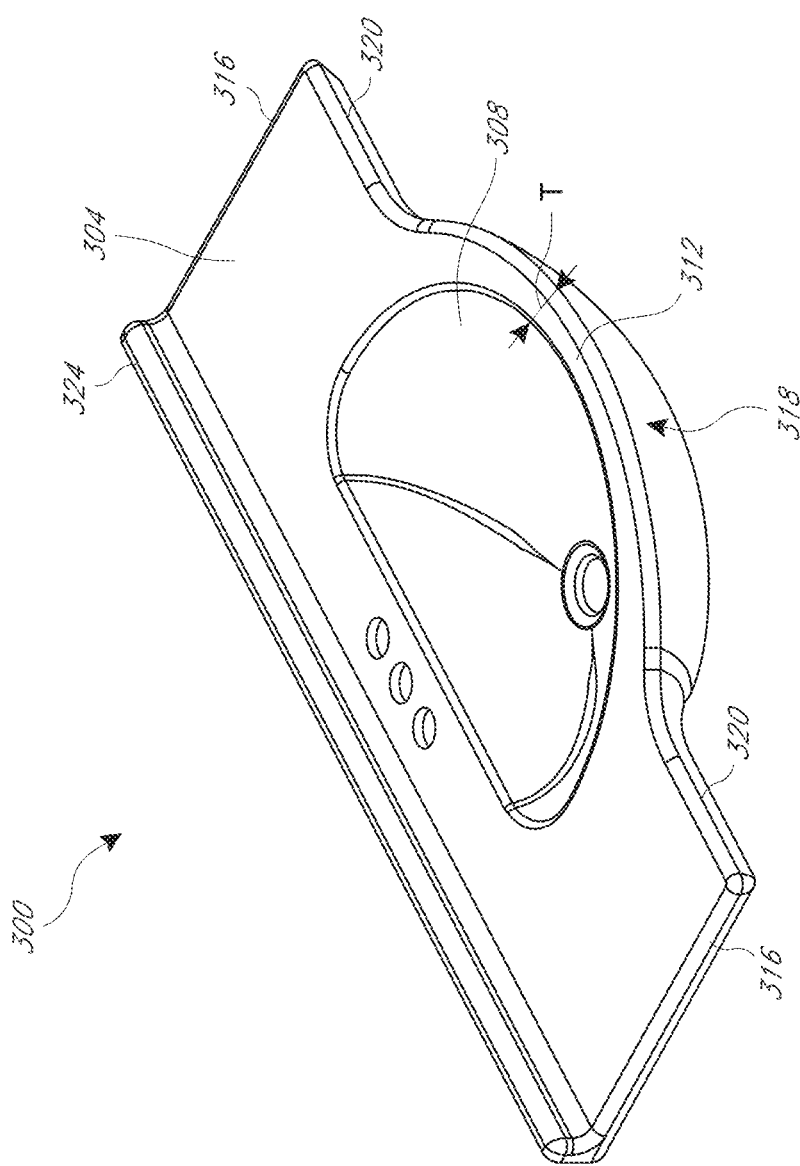
FIG. 3A is a top perspective view of an embodiment of a molded product.
Figure 3B:
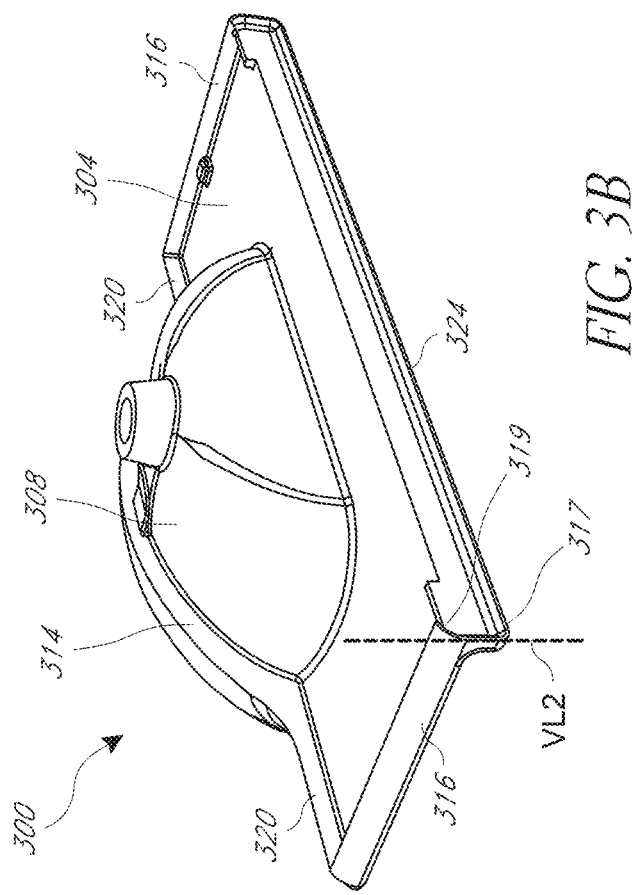
FIG. 3B is a bottom perspective view of the molded product of FIG. 2A.
Figure 3D:
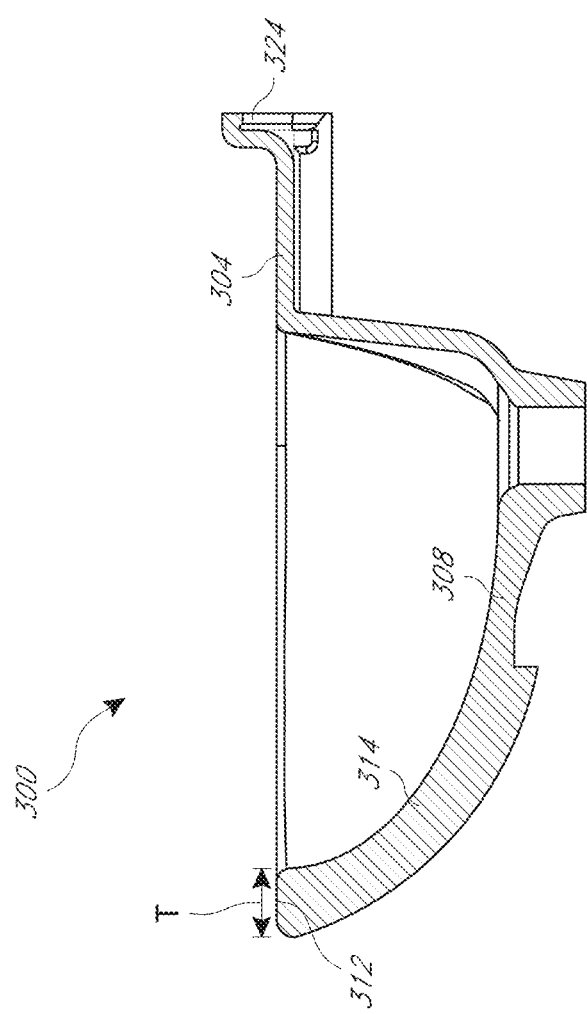
FIG. 3D is a side cross-section view of the molded product of FIG. 2A.

As illustrated in FIGS. 3A-3D, the sink portion 308 of the countertop 300 may have a rim 312. The rim 312 may have a thickness T (e.g., a thickness measured substantially parallel to the counter portion 304 and substantially perpendicular to a point on the concave surface of the rim 312). As illustrated in FIG. 3D, the sink portion 308 may have an apron-formed portion 314 have a thickness similar to or the same as the thickness T of the rim 312. The thickness T may be similar to or substantially the same as the gap G of the flexible tool 200 used to form the countertop 300. In some embodiments, the thickness T may be substantially the same as a thickness of the sink portion 308 outside the apron-formed portion 314 (e.g., the sink portion 308 may have a substantially uniform thickness). As illustrated, the width W of the counter portion 304 can be similar to or substantially the same as the distance between the sidewalls 216 of the flexible tool 200 and the bowl portion 208 of the flexible tool 200.

Figure 4:
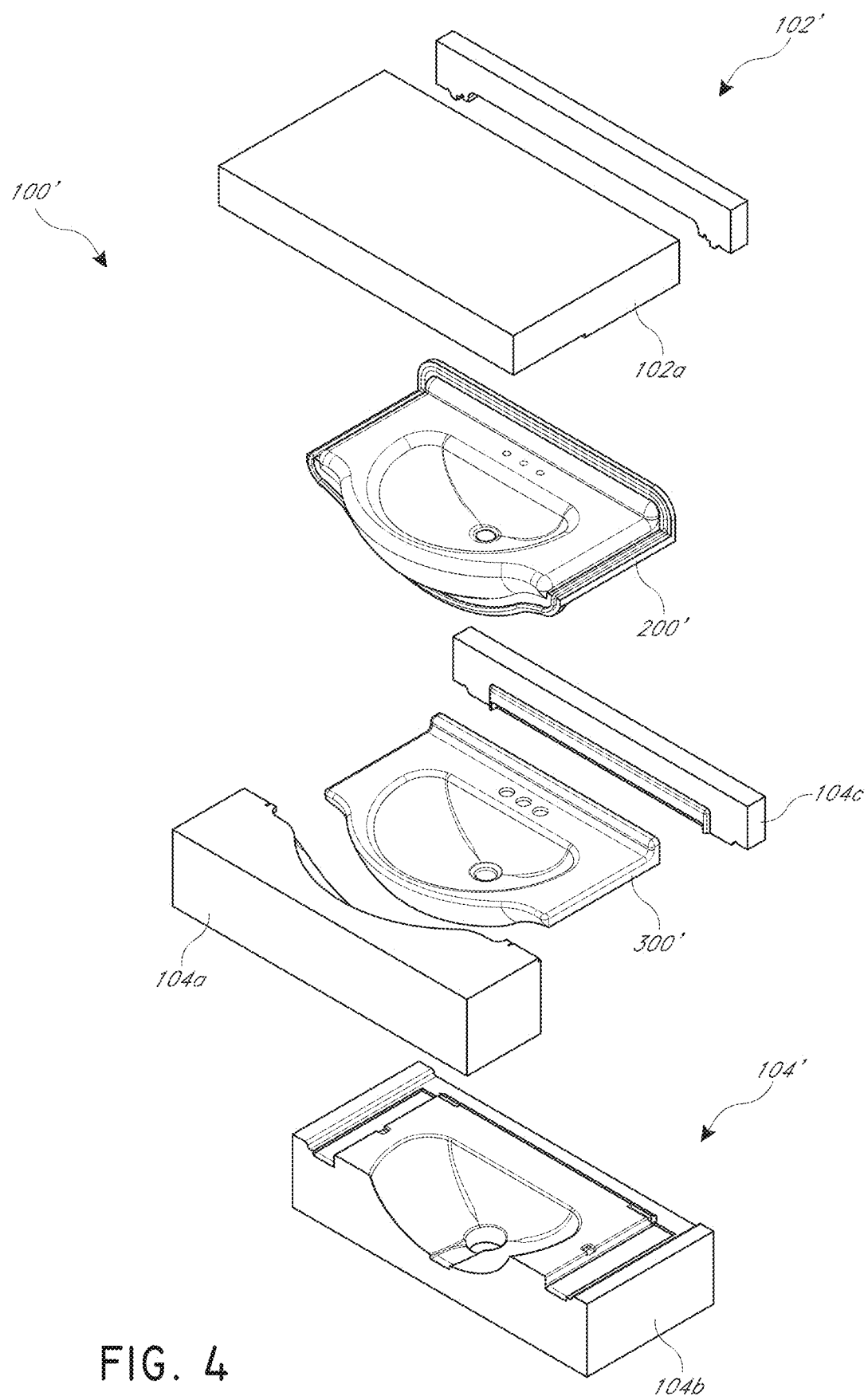
FIG. 4 is a top perspective exploded view of another embodiment of a mold assembly.
Figure 4A:
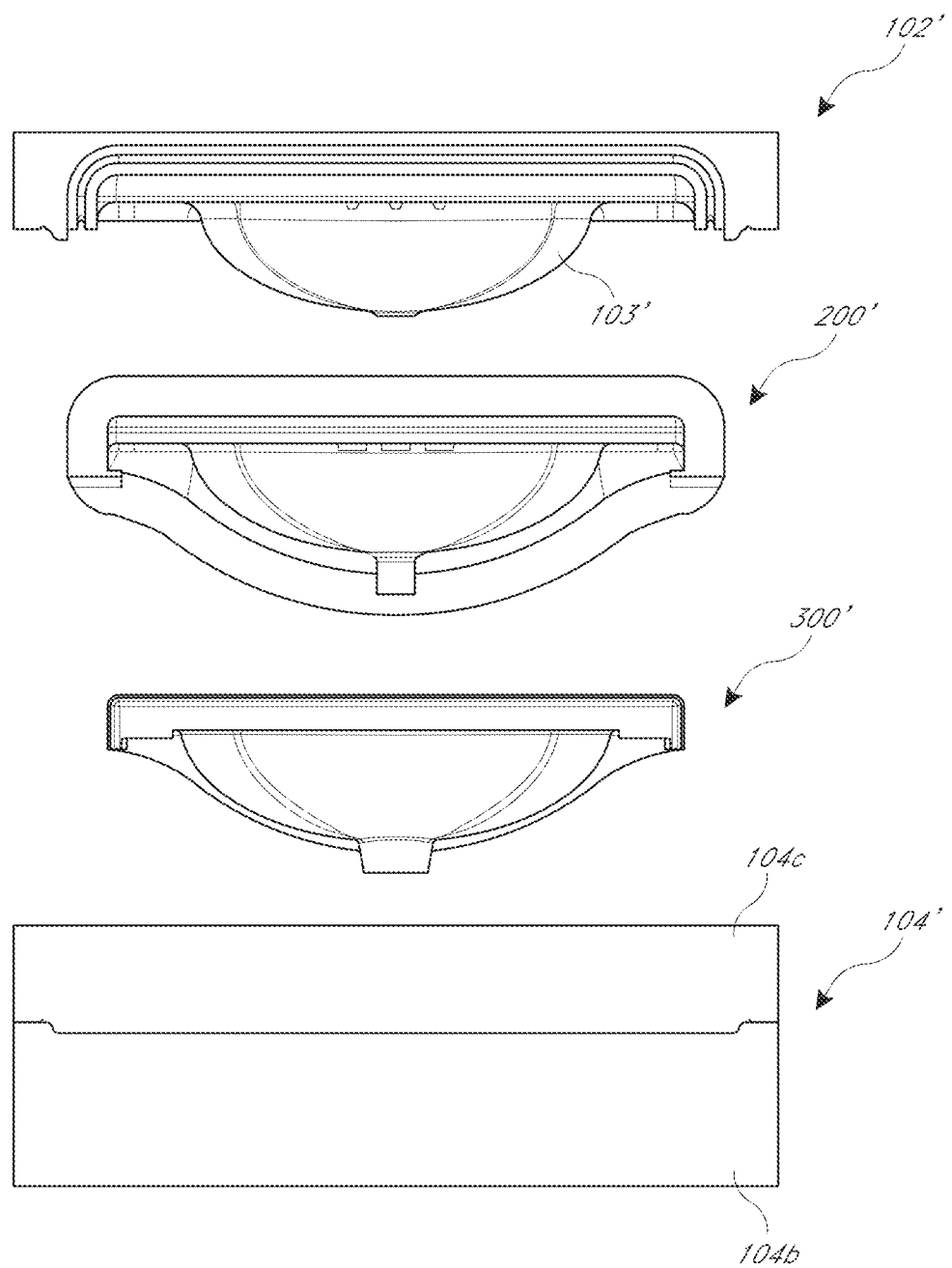
FIG. 4A is a rear exploded view of the mold assembly of FIG. 4.
Figure 4B:
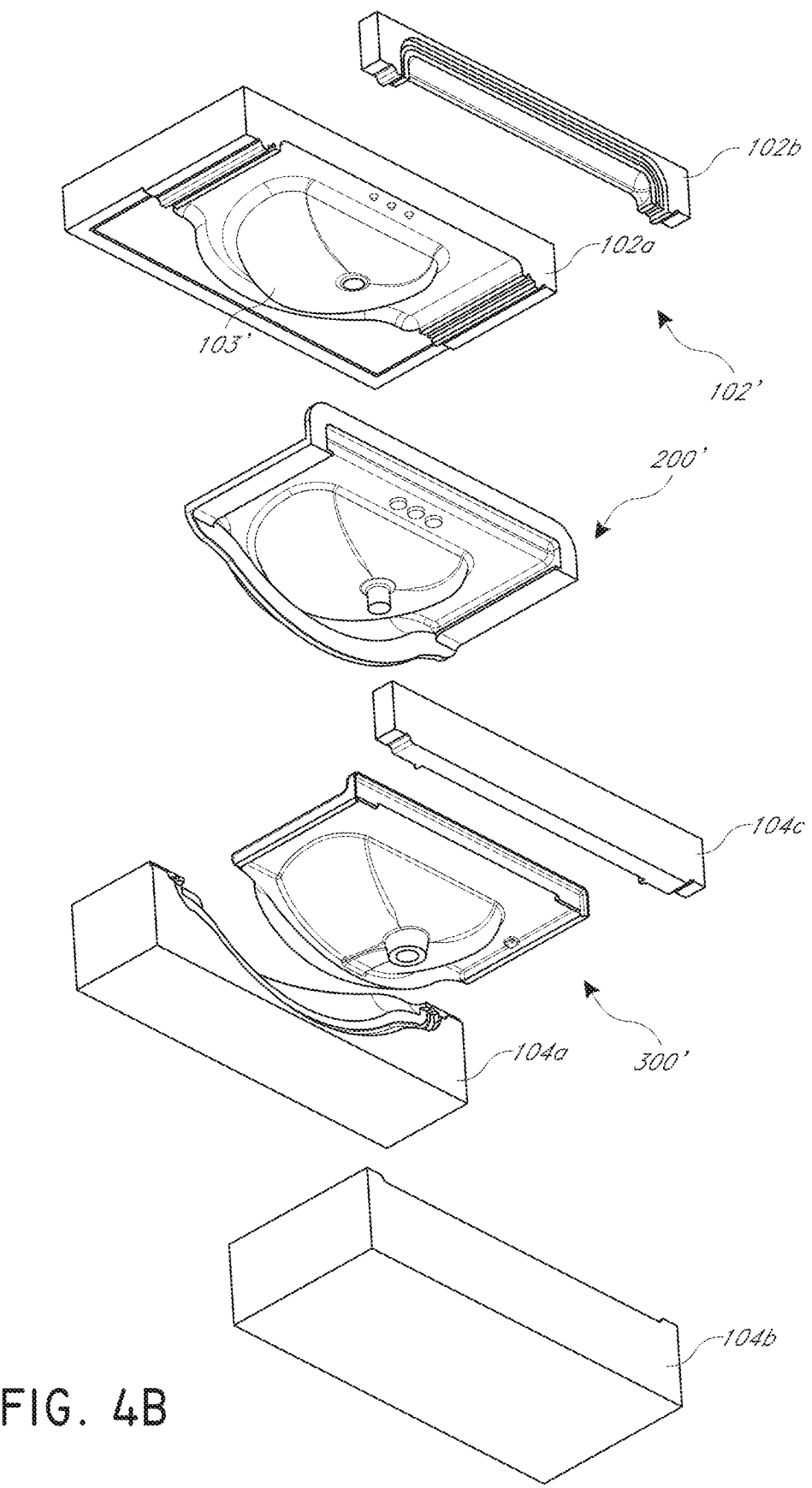
FIG. 4B is a bottom perspective exploded view of the mold assembly of FIG. 4.

FIGS. 4-5 illustrate an embodiment of a mold assembly 100' that can have components or portions that are the same as or similar to the components or portions of the mold assembly 100. Numerical reference to components is the same as previously described, except that a prime symbol (') has been added to the reference. Where such references occur, it is to be understood that the components are the same or substantially similar to previously-described components. As illustrated, the male mold plate 102' can include a main plate body 102a and a backing plate portion 102b. In some embodiments, an elastomeric seal is positioned between the main plate body 102a and the backing plate portion 102b. The female mold plate 104' can include a front plate portion 104a. The front plate portion 104a can be removably attached to a main female plate portion 104b. In some cases, the female mold plate 104' includes a removable back plate 104c. One or more elastomeric seals can be positioned between the front plate portion 104a, the main female plate portion 104b, and the back plate 104c. As illustrated in FIG. 5, the width W' of the counter portion 304' of the molded product 300' can be less than the width W of the counter portion 304 of the molded product 300 illustrated in FIG. 3C.

Figure 6:
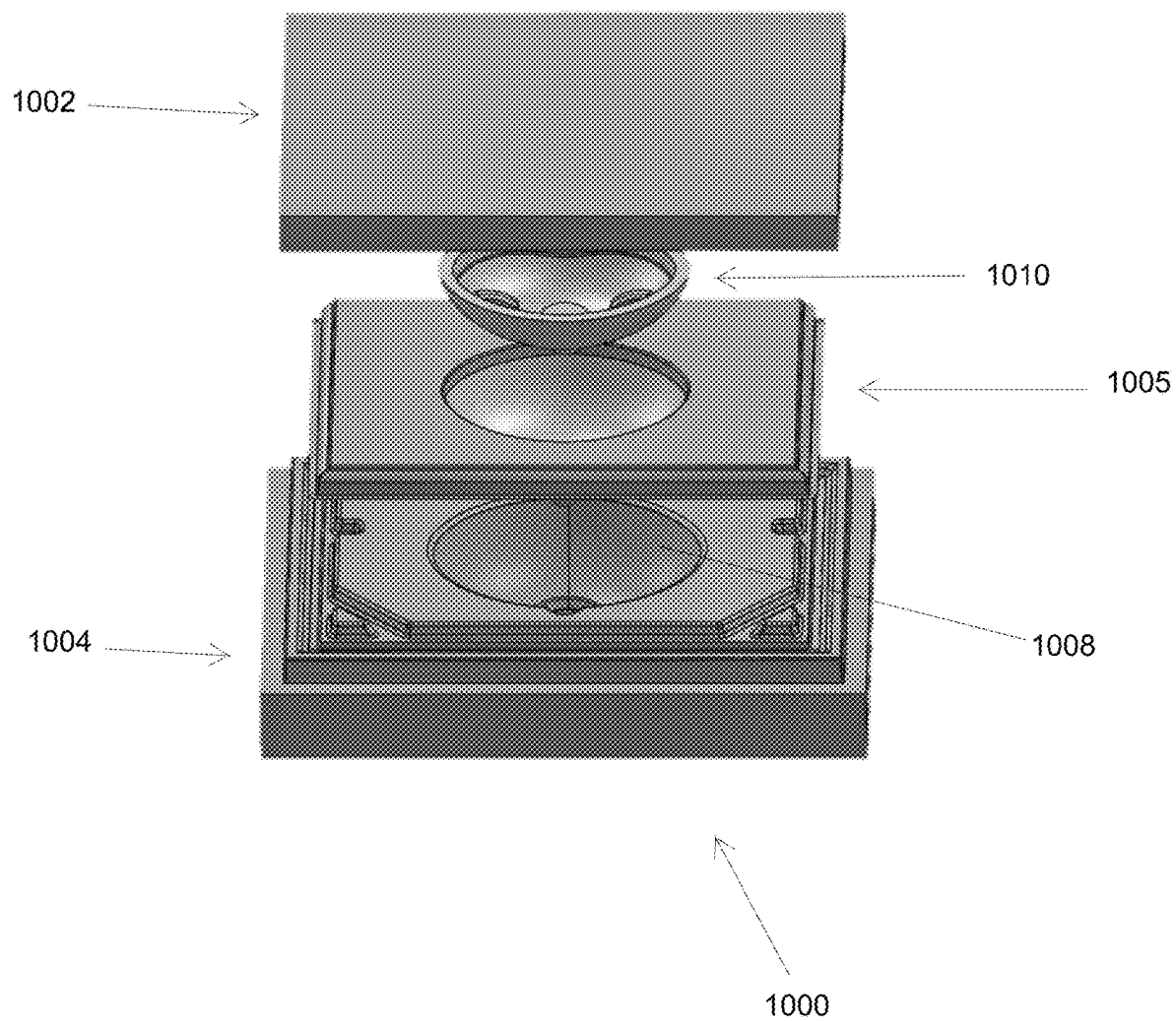
FIG. 6 is a top perspective exploded view of another embodiment of a molding assembly.
Figure 7:
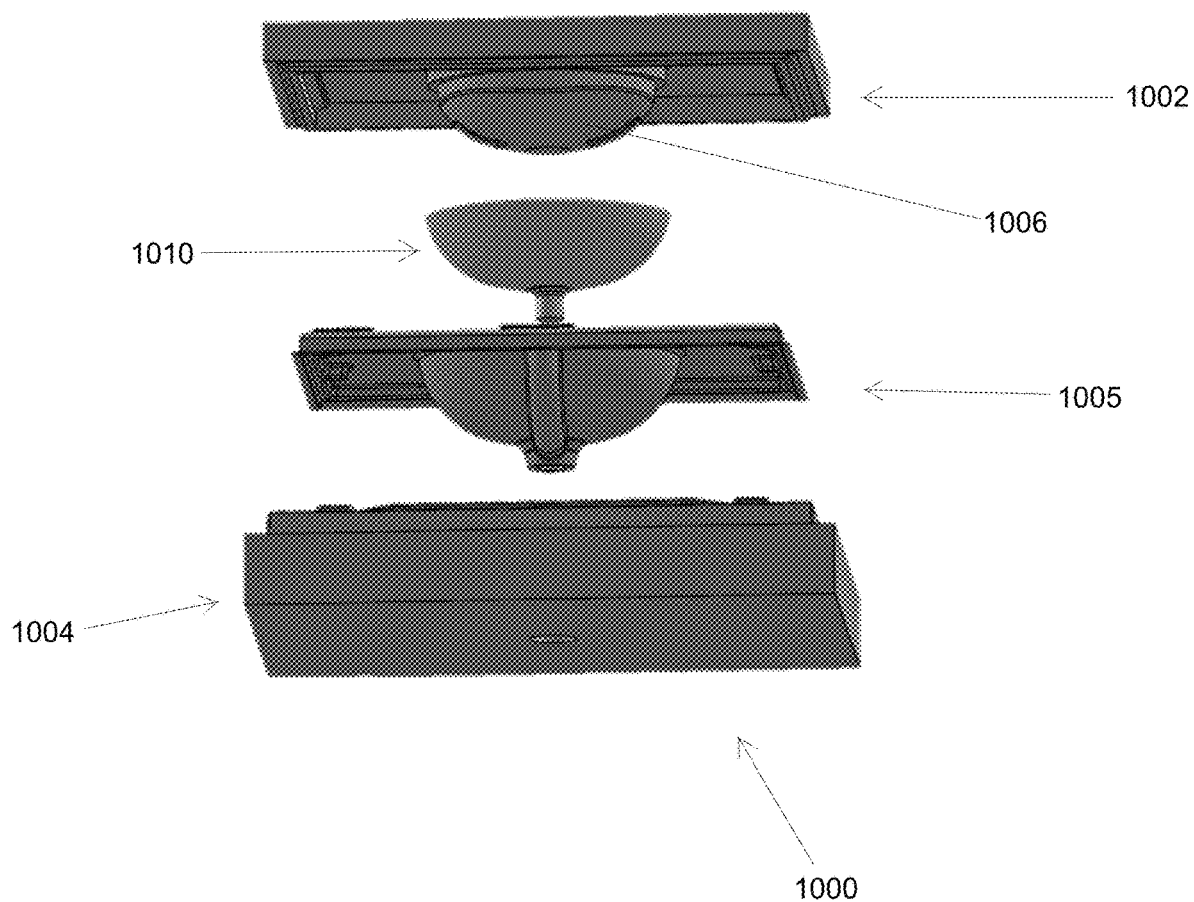
FIG. 7 is a bottom perspective exploded view of the molding assembly of FIG. 6.

As illustrated in FIGS. 6 and 7, a molding assembly 1000 can include a male mold portion 1002 and a female mold portion 1004. The male mold portion 1002 can include one or more protrusions or extensions configured to fit at least partially within one or more recesses, slots, and/or indentations in the female mold portion 1004. The male mold portion 1002 can be completely or partially removable (e.g., via a hinge) from the female mold portion 1004. In some embodiments, the male mold portion 1002 and/or female mold portion 1004 are each formed from two or more mold sections or subcomponents. In some embodiments, each of the male and female mold portions 1002, 1004 are formed as unitary parts. For the sake of simplicity, the male and female mold portions 1002, 1004 are each herein illustrated and described as unitary parts.

The molding assembly 1000 can be configured to produce a molded countertop 1005. The male mold portion 1002 can include a male bowl portion 1006 (e.g., a protrusion). The male bowl portion 1006 can have an overall convex shape. The male bowl portion 1006 can be sized and shaped to fit at least partially within a female bowl portion 1008 of the female mold portion 1004. As illustrated, the female bowl portion 1008 can have an overall concave shape.

As illustrated in FIGS. 6 and 7, the mold assembly 1000 can include a flexible bowl insert 1010. The flexible bowl insert 1010 can be constructed from a flexible, semi-flexible, and/or resilient material. For example, the flexible insert 1010 can be constructed from a material having a durometer of less than about 20 Shore A, less than about 40 Shore A, less than about 50 Shore A, less than about 60 Shore A, less than about 75 Shore A, and/or less than about 100 Shore A. In some cases, the flexible insert 1010 is constructed from a material capable of permitting the insert 1010 to deform to fit through the opening defined by the overhang lip 1054 (FIGS. 11-12) of the finished product 1005. In some cases, the flexible insert 1010 is constructed from a material flexible enough to permit deformation of the flexible insert 1010 such that both the drain portion 1020 (FIG. 8) and upper rim 1024 (FIG. 9) of the flexible insert 1010 contact the same flat surface (e.g., a tabletop). In some embodiments, the flexible insert 1010 is constructed from a resilient material configured to return to an unflexed shape from a flexed shape upon removal of external forces on the flexible insert 1010. In some cases, the material of the flexible insert 1010 permits deformation of the flexible insert 1010 as described above without any substantial plastic deformation. In some embodiments, the flexible insert 1010 can be constructed from silicone, rubber, polymer, or some other flexible material. In some embodiments, the flexible insert 1010 is configured to releasably mate with, connect to, couple with, fit with, attach to, fasten to, adjoin to, and/or link with the male mold portion 1002 and/or with the female mold portion 1004. For example, one or more of the male and female mold portions 1002, 1004 can include mating features configured to releasably mate with mating features on the flexible insert 1010.

Figure 8:
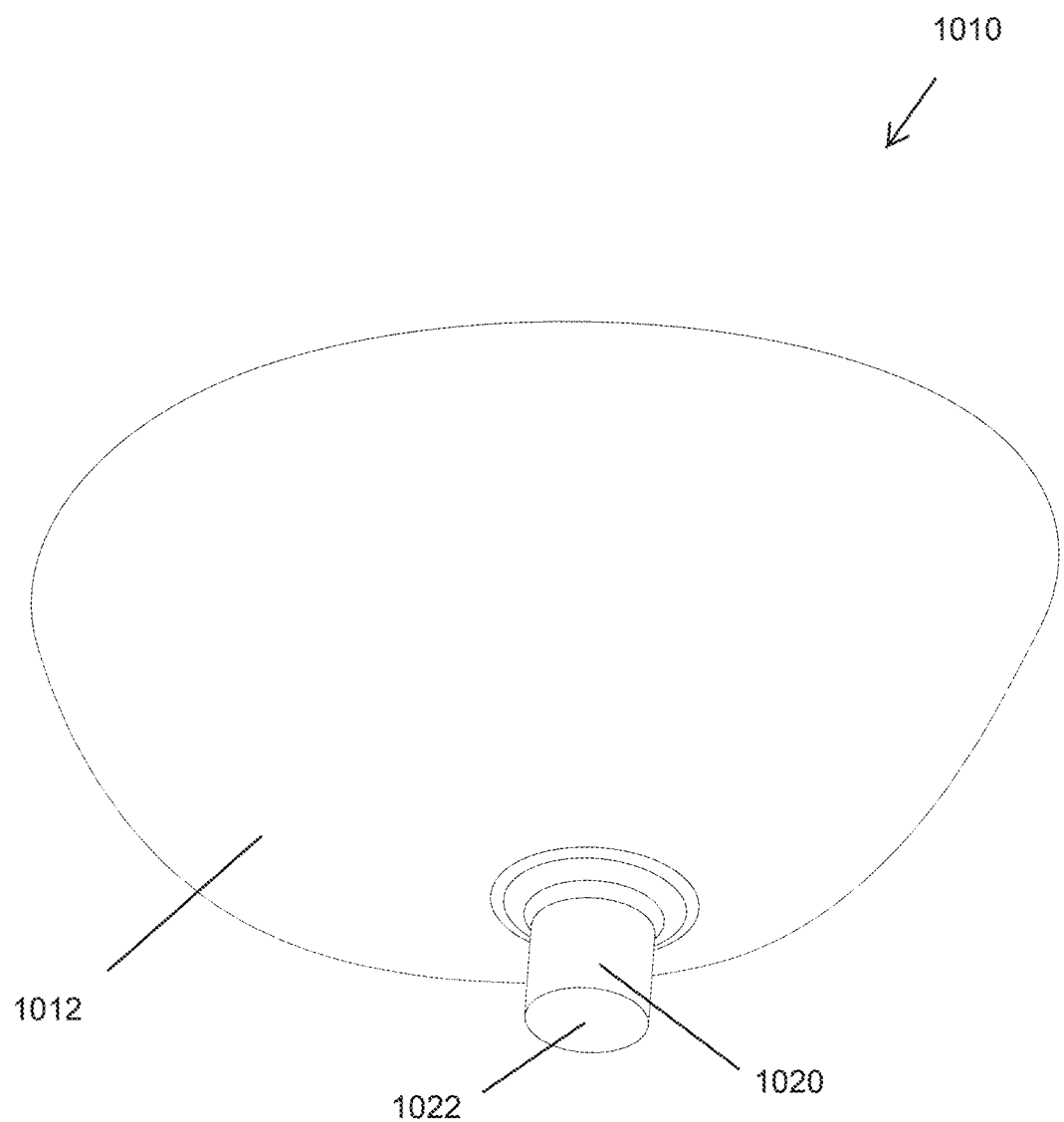
FIG. 8 is a bottom perspective view of a flexible mold insert.
Figure 9:
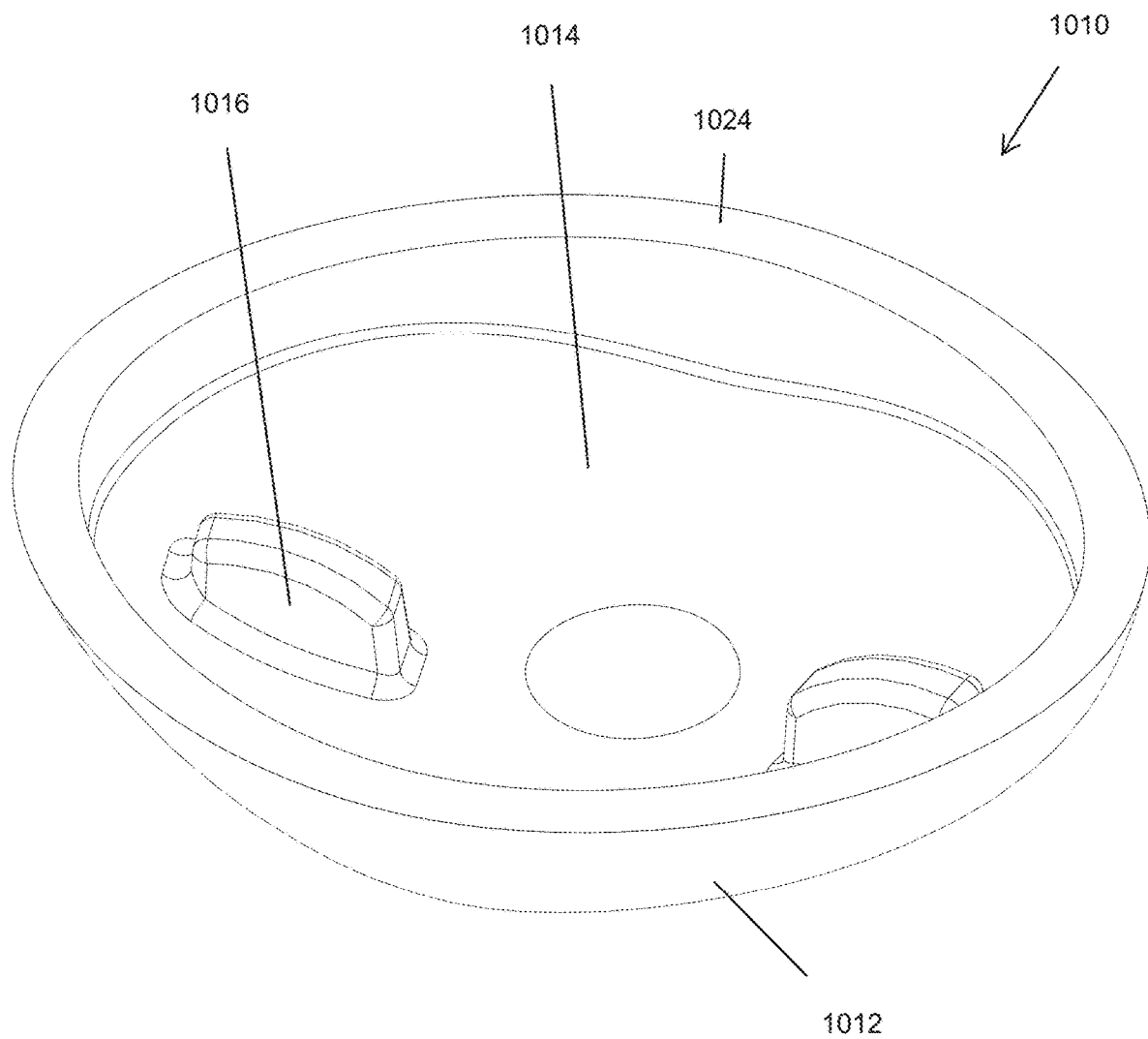
FIG. 9 is a top perspective view of the flexible mold insert of FIG. 8.

As illustrated in FIGS. 8 and 9, the flexible insert 1010 can include an outer product surface 1012 (e.g., such as on the outer surface, or an outer convex surface) and an inner mold surface 1014 (e.g., a concave surface). The outer product surface 1012 can have a generally curved (e.g., hemispherical or elliptical), generally oblong (e.g., rounded-cornered rectangle or triangle), and/or generally polygonal shape. In some embodiments, the inner mold surface 1014 has a generally curved, generally oblong, and/or generally polygonal shape. In some embodiments, the inner mold surface 1014 is shaped to match a shape of the male mold portion 1002 (e.g., the male bowl portion 1006). The mold surface 1014 can include one or more mating features configured to releasably mate with mating features of the male mold portion 1002. For example, the mold surface 1014 can include one or more protrusions 1016 configured to releasably mate and/or connect with one or more recesses 1018 (FIG. 10) of the male mold portion 1002. In some embodiments, the mold surface 1014 includes one or more recesses configured to releasably mate and/or connect with one or more protrusions on the male mold portion 1002. In some embodiments, mating between the mating features of the male mold portion 1002 and the mold surface 1014 of the flexible insert 1010 can inhibit or prevent inadvertent separation of the flexible insert 1010 from the male mold portion 1002 (e.g., via gravity). The protrusions 1016 can be sized to be larger than the recesses 1018. Such sizing can compress the protrusions 1016 when they are inserted into the recesses 1018 to reduce the likelihood that the protrusions inadvertent separation of the flexible insert 1010 from the mold portion 1002. In some embodiments, the mating features define interference surfaces which inhibit or prevent separation of the flexible insert 1010 from the male mold portion 1002 unless the flexible insert 1010 is deformed.

The flexible insert 1010 can include a drain portion 1020 (FIG. 8). In some cases, the flexible insert 1010 does not include a drain portion. The drain portion 1020 can be, for example, a protrusion extending from the product surface 1012 of the flexible insert 1010. The drain portion 1020 can have a generally cylindrical shape. In some embodiments, the drain portion 1020 has a central axis. The drain portion 1020 can have a bottom end 1022. In some embodiments, the bottom end 1022 of the drain portion 1020 is flat. In some cases, the bottom end 1022 of the drain portion 1020 is generally planar and perpendicular to the central axis of the drain portion 1020.

The flexible insert 1010 can include an upper rim 1024 (FIG. 9) defined on an upper portion of the flexible insert 1010. For example, the upper rim 1024 can extend between the product surface 1012 and the mating surface 1014 of the flexible insert 1010. In some cases, the upper rim 1024 is generally planar. In some embodiments, the upper rim 1024 is generally perpendicular to the central axis of the drain portion 1020 of the flexible insert 1010. In some cases, the upper rim 1024 includes one or more non-planar portions (e.g., protrusions, divots, waves, ridges, ribs, or other non-planar shapes).

Figure 10:
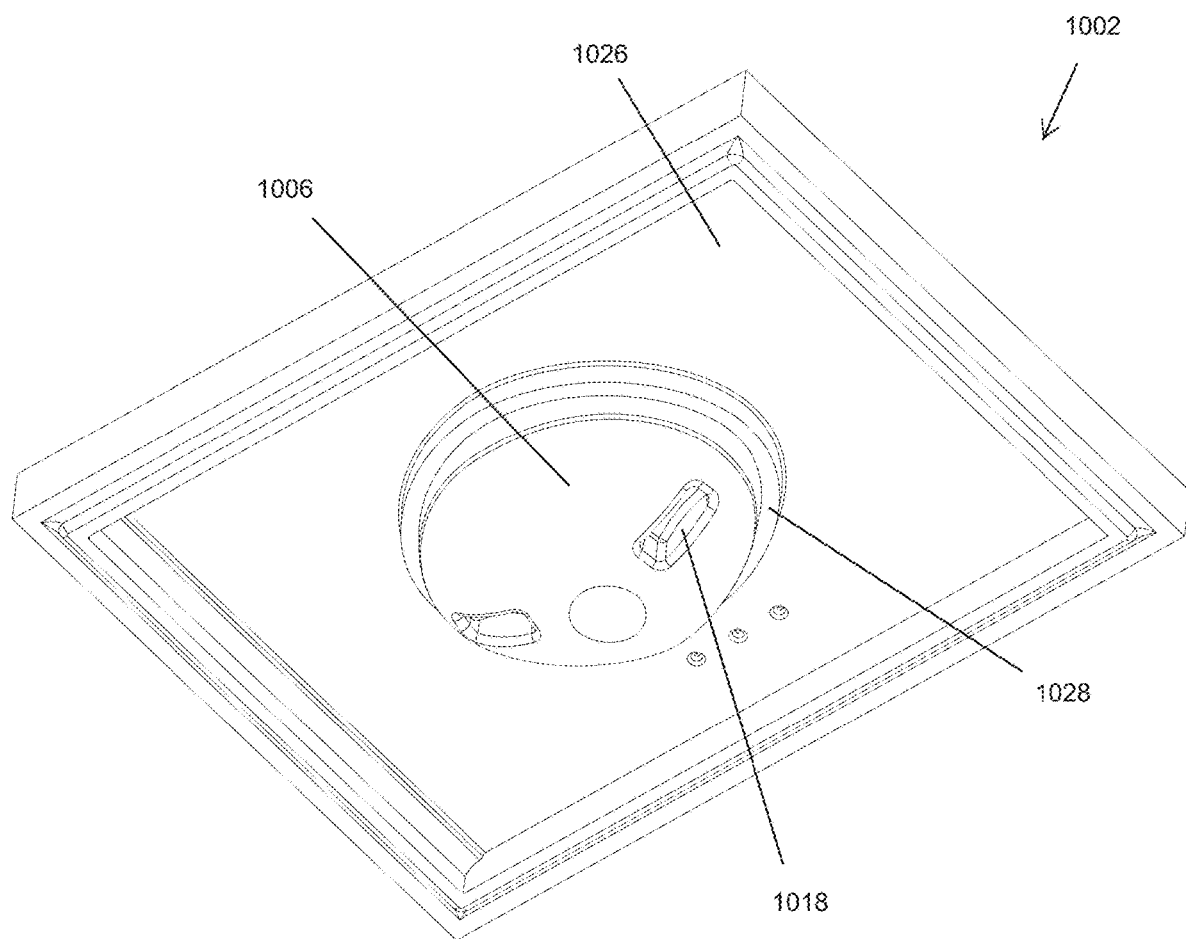
FIG. 10 is a bottom perspective view of a male mold component of the molding assembly of FIG. 6.
Figure 11:
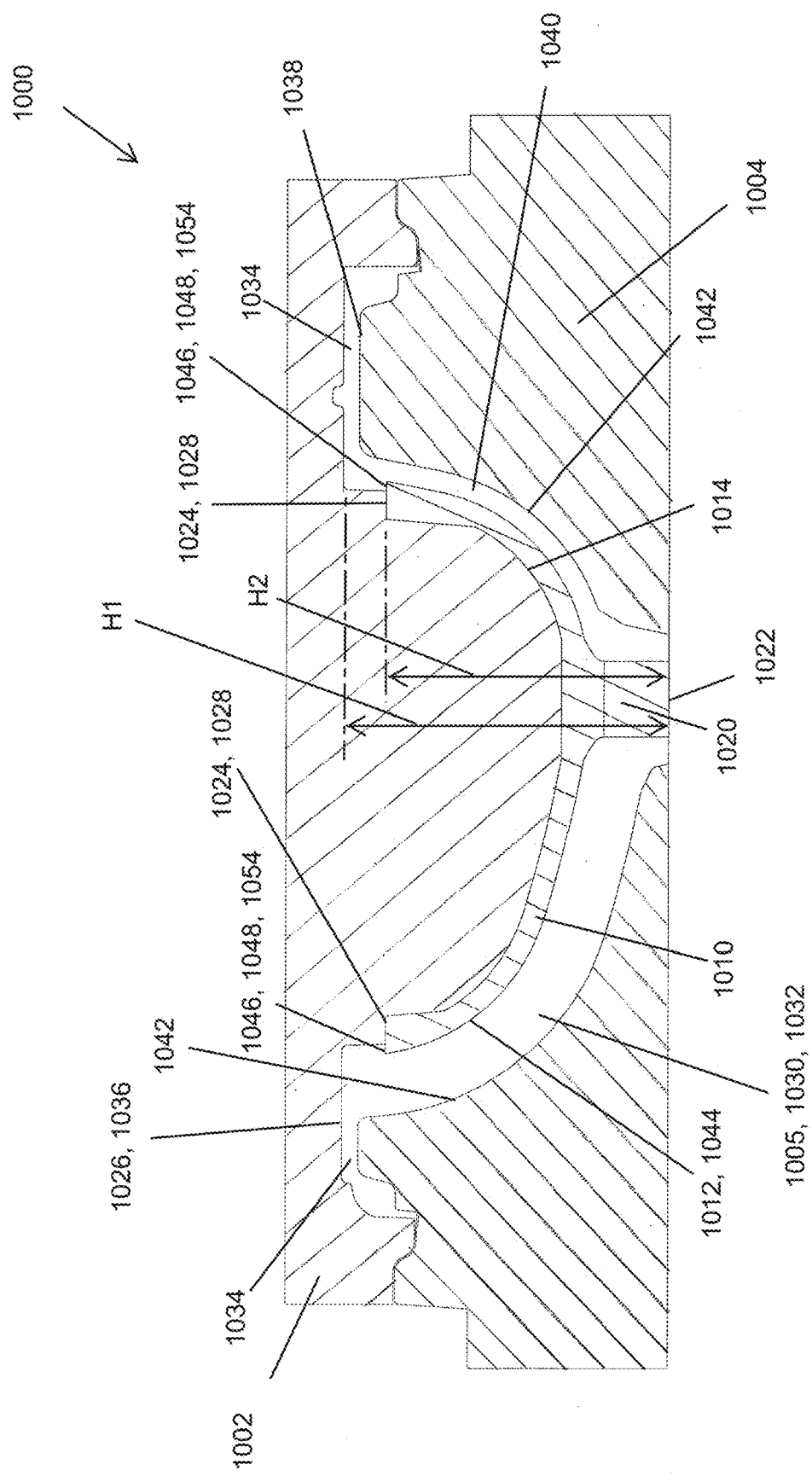
FIG. 11 is a side cross-section view of the molding assembly of FIG. 6.

As illustrated in FIG. 10 the male bowl portion 1006 can extend from a counter portion 1026 of the male mold portion 1002. The counter portion 1026 can be planar or generally planar. In some embodiments, the counter portion 1026 includes one or more raised areas, including slopes and/or steps. For example, the counter portion 1026 can include one or more apertures or indentations for fixtures. In some cases, an outer perimeter of the counter portion 1026 includes one or more steps or other edge features. The counter portion 1026 can correspond to an upper surface of the countertop portion 1050 of the finished product 1005, described below. In some embodiments, the recesses 1018 of the male mold portion 1002 are positioned at least partially in the male bowl portion 1006. As illustrated, the male mold portion 1002 can include an overhang portion 1028. The overhang portion 1028 can be positioned around all or a portion or a perimeter of the male bowl portion 1006 at the interface between the male bowl portion 1006 and the counter portion 1026 of the male mold portion 1002. In some embodiments, the overhang portion 1028 forms a step between the male bowl portion 1006 and the counter portion 1026. The overhang portion 1028 can be generally planar. In some embodiments, as illustrated in FIG. 11, the overhang portion 1028 can overhang and be generally parallel to the upper rim 1024 of the flexible insert 1010 when the mold assembly 1000 is assembled. The overhang portion 1028 can have a thickness, as measured generally parallel to the counter portion 1026, less than a thickness of the upper rim 1024 in the same frame of reference. For example, the thickness of the overhang portion 1028 can be less than 9/10, less than 19/20, less than 4/5, less than 2/3, less than 3/4, and/or less than 1/2 of the thickness of the upper rim 1024. In some embodiments, the thickness ratio between the overhang portion 1028 and the upper rim 1024 is constant or substantially constant around a perimeter of the upper rim 1024. In some embodiments, the thickness ratio between the overhang portion 1028 and the upper rim 1024 is non-constant around the perimeter of the upper rim 1024. Utilizing an overhang portion 1028 thinner than the upper rim 1024 of the flexible tool 1010 can create a negative draft for the finished product 1005 (e.g., the overhang lip 1054, described below with respect to FIG. 12).

In some cases, a mold interior volume 1030 is formed between the male mold portion 1002 and female mold portion 1004 when the molding assembly 1000 is assembled. As illustrated in FIG. 11, the flexible insert 1010 can be configured to fit at least partially within the mold interior volume 1030 when the molding assembly 1000 is assembled.

The portion of mold interior volume 1030 not occupied by the flexible insert 1010 can define a product volume 1032. The product volume 1032 can generally match the size and shape of the finished product 1005. Product volume 1032 can include a countertop portion 1034 at or near a top of the product volume 1032. The countertop portion 1034 can include an upper surface 1036. The upper surface 1036 of the countertop portion 1034 can be generally planar. As illustrated, the countertop portion 1034 can include a lower surface 1038 spaced from the upper surface 1036.

In some embodiments, the product volume 1032 includes a sink bowl portion 1040. The sink bowl portion 1040 can extend downward from the countertop portion 1034. The sink bowl portion 1040 can be defined by surfaces of the male mold portion 1002, surfaces of the female mold portion 1004, and/or by surfaces (e.g., the product surface 1012) of the flexible insert 1010. The sink bowl portion 1040 can include a concave lower surface 1042 corresponding to a convex surface of the finished product 1005. The sink bowl portion 1040 can include a convex upper surface 1044 corresponding to a concave portion of the finished product 1005.

As illustrated, the upper lip 1024 of the flexible insert 1010 can extend outward (e.g., laterally outward, such as left and right in FIG. 11) beyond the overhang portion 1028 of the male mold portion 1002. This outward extension 1046 can correspond to an overhang lip 1048 of the product volume 1032 and/or to the overhang 1054 of the finished product 1005. In some embodiments, the outward extension 1046 can be greater than or equal to about 1/20, about 1/10, about 1/8, about 1/6, about 1/5 and/or 1/2 of the thickness of the upper lip 1024 as measured generally parallel to the countertop portion 1026. In some embodiments, the ratio between the outward extension 1046 and the thickness of the upper lip 1024 is non-constant around a perimeter of the upper lip 1024. In some embodiments, the ratio between the outward extension 1046 and the thickness of the upper lip 1024 is constant or substantially constant around a perimeter of the upper lip 1024.

In some embodiments, the product volume 1032 can have a first height H1, as measured vertically (e.g., in the frame of reference of FIG. 11) from the bottom end 1022 of the drain portion 1020 of the flexible insert 1010 to the upper surface 1036 of the countertop portion 1034. The flexible insert 1010 can have a second height H2, as measured vertically from the bottom end 1022 of the drain portion 1020 of the flexible insert 1010 to the upper rim 1024 of the flexible insert 1010. As illustrated, the first height H1 can be greater than the second height H2. In some embodiments, the second height H2 is less than 19/20, less than 9/10, less than 4/5, less than 3/4, and/or less than 5/8 of the first height H1. In some embodiments, the second height H2 is approximately 9/10 of the first height H1.

In some embodiments, a method of forming the finished product 1005 can include mating the flexible insert 1010 with the male mold portion 1002, such as by connecting the flexible insert 1010 to the male mold portion 1002. The product surface 1012 of the flexible insert 1010 can be coated with a gel coat or other coating having a first color and a first texture. In some cases, the product surface 1012, or some portion thereof, is coated with a second gel coat or other coating having a second color and/or a second texture. The second color can be the same as or different from the first color. The second texture can be the same as or different from the first texture.

The method can include mating the male mold portion 1002 with the female mold portion 1004 to form the mold interior volume 1030, and/or the product volume 1032. In some embodiments, the method includes coating one or more surfaces of the male and female mold portions 1002, 1004 (e.g., the surfaces defining a portion of the product volume 1032) with a gel coat or other coating having a third color and third texture. One or more of the surfaces of the male and female mold portion 1002, 1004 can be coated before or after mating the male and female mold portions 1002, 1004. In some embodiments, only the lower surface 1042 of the flexible insert 1010 is coated with a gel coat having a different color or texture than the gel coat covering the sections of the male mold portion 1002 defining the product volume 1032. In some embodiments, the first color is different from the third color. In some cases, the first texture is different from the third texture. In some cases, neither the male mold portion 1002 nor the female mold portion 1004 are coated with a gel coat (e.g., only the flexible insert 1010 is coated with a gel coat).

The method can include backing the gel coat(s) with a composite matrix material in the product volume 1032. The method can include setting the composite matrix in the product volume 1032 to form the product 1005. The method can include separating the male mold portion 1002 from the female mold portion 1004 and/or the flexible insert 1010 from the male mold portion 1002. For example, the flexible insert 1010 can be removed from the male mold portion 1002 before, during, or after removal of the male mold portion 1002 from the female mold portion 1004.

Figure 12:
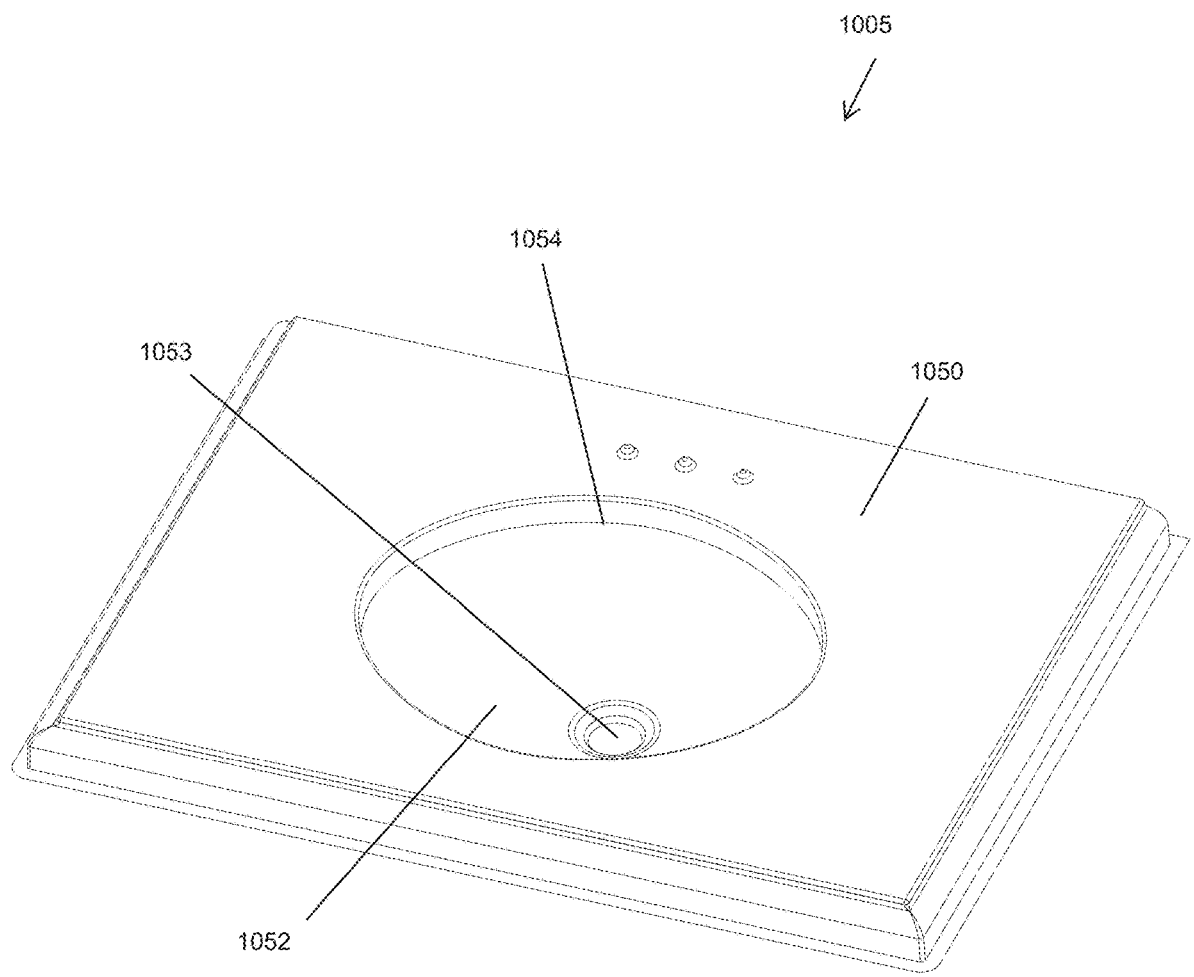
FIG. 12 is a top perspective view of the molded product of FIG. 6.

As illustrated in FIG. 12, the product 1005 can include a countertop portion 1050. The countertop portion 1050 can have the same or a similar shape as the countertop portion of the product volume 1032. The product 1005 can include a recessed bowl 1052 extending downward from the countertop portion 1050. Preferably the recessed bowl 1052 is formed as a unitary part with the countertop portion 1050 (e.g., the countertop portion 1050 and the bowl 1052 are formed as a single continuous unit). The recessed bowl 1052 can have a same or similar shape to the sink bowl portion 1040 of the product volume 1032. An inner surface of the recessed bowl 1052 (e.g., a concave surface) can have a same or similar shape as the outer product surface 1012 of the flexible insert 1010. The recessed bowl 1052 can include a drain 1053 at a bottom of the recessed bowl 1052. The product 1005, as discussed above, can include an overhang lip 1054 formed by and corresponding with the overhang lip 1048 of the product volume 1032. The overhang lip 1054 can produce an appearance of a recessed bowl 1052 separate from the countertop portion 1050 where the recessed bowl 1052 is formed as an integral part with the countertop portion 1050. In some embodiments, the overhang lip 1054 can extend a moderate to considerable distance from the recessed bowl 1052, as measured generally parallel to the countertop portion 1050. For example, the overhang lip 1054 can extend at least 0.5 mm, at least 1 mm, at least 1.75 mm, at least 3 mm, at least 5 mm, at least 7.5 mm, and/or at least 9 mm from the recessed bowl 1052, as measured generally parallel to the countertop portion 1050. In some embodiments, a shadow is formed by the overhang lip 1054 on the recessed bowl 1052 when light is shown from any origin above the countertop portion 1050.

The recessed bowl 1052 can include a concave surface having a gel coat or other coating imparted from the product surface 1012 of the flexible insert 1010. In some cases, the drain 1053 is coated with the same material as the recessed bowl 1052. The overhang lip 1054 and/or countertop portion 1050 of the product 1005 can have a gel coat or other coating imparted from one or more of the surfaces of the male and female mold portions 1002, 1004 defining the product volume 1032. In some cases, the recess bowl 1052 (e.g., the concave surface) has a color different from the color of the overhang lip 1054 and/or countertop portion 1050. In some such cases, the recessed bowl 1052 can appear to be an undermount bowl separate from the countertop portion 1050, though the recessed bowl 1052 and countertop 1050 are formed as a unitary part. Forming the bowl 1052 and countertop 1050 as a unitary part can increase the structural integrity of the overall product 1005. In some cases, forming the bowl 1052 and countertop 1050 as a unitary part can reduce manufacturing costs and/or shipping costs for the product 1005, as compared to countertop assemblies where the bowl and countertop are formed separately. While the gelcoat or coating of the recessed bowl 1052 and countertop 1050 may have a different color or coating, the body or backing material of the recessed bowl 1052 and countertop 1050 desirably comprise a continuous uniform material.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

Although the mold assembly has been disclosed in the context of certain preferred embodiments and examples, it will be understood by those skilled in the art that the present disclosure extends beyond the specifically disclosed embodiments to other alternative embodiments and/or uses of the mold assembly and obvious modifications and equivalents thereof. In addition, while a number of variations of the mold assembly have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed mold assemblies. Thus, it is intended that the scope of the present disclosure herein disclosed should not be limited by the particular disclosed embodiments described above, but should be determined only by a fair reading of the claims that follow.

What is claimed is:

1. A countertop comprising:
    a countertop portion including:
        a main body comprising a top surface extending along a plane, a bottom surface opposite the top surface, a first side, a second side opposite the first side, a third side generally perpendicular to the first and second sides, and a fourth side opposite the third side and generally perpendicular to the first and second sides;

a plurality of countertop side portions integral with the main body, each of the plurality of countertop side portions extending generally perpendicular relative to said plane along which said top surface of the main body extends, each of the plurality of countertop side portions extending from one of the first side, the second side, the third side, and the fourth side, each of the plurality of countertop side portions extending along a length of said one of the first side, the second side, the third side, and the fourth side;

a bowl portion recessed below the plane along which said top surface of the main body of the countertop portion extends, the bowl portion comprising a concave inner surface, a convex outer surface opposite said concave inner surface, and a drain opening, wherein an upper portion of the bowl portion joins the main body of the countertop portion at a junction defined along a countertop portion opening that opens into the bowl portion;

a drain portion extending outward from the convex outer surface of the bowl portion around the drain opening of the bowl portion;

an overhang lip extending along an entirety of a perimeter of said junction defined along said countertop portion opening, said overhang lip extending inward from said junction a distance over a portion of the bowl portion, said overhang lip forming a shadow over at least a portion of the concave inner surface of the bowl portion when light is shown from a location above the countertop;

a first coating disposed on the concave inner surface of the bowl portion and an inner surface of the drain portion; and a second coating disposed on the top surface of the main body of the countertop portion, the bottom surface of the main body of the countertop portion, and the overhang lip, wherein the second coating has a different color and a different texture than said first coating;

wherein the countertop portion, the bowl portion, the drain portion, and the overhang lip comprise a continuous uniform material.

2. The countertop of claim 1, wherein said distance is at least 3 mm.

3. The countertop of claim 1, wherein at least said first and second sides of the main body of the countertop portion are substantially straight.

4. The countertop of claim 1, wherein said countertop portion opening is ovular.

5. A countertop comprising:
a countertop portion;
a bowl portion recessed from the countertop portion, the bowl portion comprising an inner surface, an outer surface opposite said inner surface, and a drain opening;

a drain portion extending outward from the outer surface of the bowl portion around the drain opening of the bowl portion;

an overhang lip extending from said countertop portion over a portion of the bowl portion;

a first coating disposed on the inner surface of the bowl portion and an inner surface of the drain portion; and a second coating disposed on the countertop portion and the overhang lip, wherein the second coating has at least one of a different color and a different texture than said first coating;

wherein the countertop portion, the bowl portion, the drain portion, and the overhang lip comprise a continuous uniform material.

6. The countertop of claim 5, wherein said inner surface of said bowl portion is concave and wherein said outer surface of said bowl portion is convex.

7. The countertop of claim 5, wherein the second coating has a different color than said first coating.

8. The countertop of claim 5, wherein the second coating has a different texture than said first coating.

9. The countertop of claim 5, wherein the second coating has a different color and a different texture than said first coating.

10. The countertop of claim 5, wherein said overhang lip extends at least 3 mm over said portion of the bowl portion.

11. The countertop of claim 5, wherein said countertop portion comprises:
a main body comprising a top surface extending along a plane, a bottom surface opposite the top surface, a first side, a second side opposite the first side, a third side generally perpendicular to the first and second sides, and a fourth side opposite the third side and generally perpendicular to the first and second sides; and a plurality of countertop side portions integral with the main body, each of the plurality of countertop side portions extending generally perpendicular relative to said plane along which said top surface of the main body extends, each of the plurality of countertop side portions extending from one of the first side, the second side, the third side, and the fourth side, each of the plurality of countertop side portions extending along a length of said one of the first side, the second side, the third side, and the fourth side.

12. The countertop of claim 5, wherein an inner perimeter of the overhang lip comprises a rounded shape.

13. The countertop of claim 5, wherein said overhang lip extends around an entirety of a perimeter of an upper end of the bowl portion.

14. The countertop of claim 5, wherein said bowl portion comprises a rounded shape.

* * * * *